(12) United States Patent
Amidon et al.

(10) Patent No.: US 9,208,239 B2
(45) Date of Patent: Dec. 8, 2015

(54) METHOD AND SYSTEM FOR AGGREGATING MUSIC IN THE CLOUD

(75) Inventors: Christopher M. Amidon, Apex, NC (US); Harold Sutherland, San Jose, CA (US); Hugh Svendsen, Chapel Hill, NC (US)

(73) Assignee: ELOY TECHNOLOGY, LLC, Wilmington, DE (US)

( * ) Notice: Subject to any disclaimer, the term of this patent is extended or adjusted under 35 U.S.C. 154(b) by 656 days.

(21) Appl. No.: 13/172,178

(22) Filed: Jun. 29, 2011

(65) Prior Publication Data
US 2012/0117146 A1 May 10, 2012

Related U.S. Application Data

(60) Provisional application No. 61/387,728, filed on Sep. 29, 2010.

(51) Int. Cl.
*G06F 15/16* (2006.01)
*G06F 17/30* (2006.01)

(52) U.S. Cl.
CPC ................................. *G06F 17/3087* (2013.01)

(58) Field of Classification Search
CPC .............. H04L 65/1083; H04L 41/509; H04L 67/1021; H04L 67/104; G06F 17/30041; G06F 17/30053; G06F 17/30174; G06F 17/3087
USPC .............. 709/203, 223–224, 226, 217; 707/5, 707/765
See application file for complete search history.

(56) References Cited

U.S. PATENT DOCUMENTS

| | | |
|---|---|---|
| 5,001,554 A | 3/1991 | Johnson et al. |
| 5,490,284 A | 2/1996 | Itoh et al. |
| 5,544,313 A | 8/1996 | Shachnai et al. |
| 5,818,935 A | 10/1998 | Maa |
| 5,835,727 A | 11/1998 | Wong et al. |
| 6,160,877 A | 12/2000 | Tatchell et al. |
| 6,202,056 B1 | 3/2001 | Nuttall |
| 6,321,224 B1 | 11/2001 | Beall et al. |
| 6,349,329 B1 | 2/2002 | Mackintosh et al. |

(Continued)

FOREIGN PATENT DOCUMENTS

| | | |
|---|---|---|
| CN | 101115019 | 1/2008 |
| EP | 1221816 | 7/2002 |

(Continued)

OTHER PUBLICATIONS

"3GPP," Wikipedia, at <http://en.wikipedia.org/wiki/3GPP>, as revised Mar. 27, 2008, printed Dec. 12, 2011, 1 page.

(Continued)

*Primary Examiner* — Wing F Chan
*Assistant Examiner* — Benjamin M Thieu

(57) ABSTRACT

Cloud-based systems and methods for aggregating media collections of users are disclosed. In one embodiment, in order to generate an aggregate media collection catalog of a first user, a cloud-based media aggregation system identifies one or more second users that have an identifier that is the same as an identifier of the first user for purposes of media collection aggregation. The media aggregation system then aggregates media collection catalogs of the one or more second users with a media collection catalog of the first user to thereby provide an aggregate media collection catalog of the first user.

30 Claims, 14 Drawing Sheets

(56) References Cited

U.S. PATENT DOCUMENTS

| | | |
|---|---|---|
| 6,466,980 B1 | 10/2002 | Lumelsky et al. |
| 6,484,165 B1 | 11/2002 | Beall et al. |
| 6,618,593 B1 | 9/2003 | Drutman et al. |
| 6,633,903 B1 | 10/2003 | Gould |
| 6,681,108 B1 | 1/2004 | Terry et al. |
| 6,714,215 B1 | 3/2004 | Flora et al. |
| 6,728,760 B1 | 4/2004 | Fairchild et al. |
| 6,748,376 B1 | 6/2004 | Beall et al. |
| 6,820,063 B1 | 11/2004 | England et al. |
| 6,886,035 B2 | 4/2005 | Wolff |
| 6,907,458 B2 | 6/2005 | Tomassetti et al. |
| 6,920,281 B1 | 7/2005 | Agnibotri et al. |
| 6,953,886 B1 | 10/2005 | Looney et al. |
| 6,954,790 B2 | 10/2005 | Forslow |
| 6,987,221 B2 | 1/2006 | Platt |
| 6,993,532 B1 | 1/2006 | Platt et al. |
| 7,024,424 B1 | 4/2006 | Platt et al. |
| 7,103,645 B2 | 9/2006 | Leighton et al. |
| 7,113,999 B2 | 9/2006 | Pestoni et al. |
| 7,117,266 B2 | 10/2006 | Fishman et al. |
| 7,136,945 B2 | 11/2006 | Gibbs et al. |
| 7,149,977 B2 | 12/2006 | Zaner et al. |
| 7,197,490 B1 | 3/2007 | English |
| 7,197,557 B1 | 3/2007 | Asar et al. |
| 7,206,568 B2 | 4/2007 | Sudit |
| 7,260,198 B1 | 8/2007 | Scott et al. |
| 7,269,249 B2 | 9/2007 | Woodring |
| 7,280,646 B2 | 10/2007 | Urban et al. |
| 7,296,031 B1 | 11/2007 | Platt et al. |
| 7,302,253 B2 | 11/2007 | Moody et al. |
| 7,310,676 B2 | 12/2007 | Bourne |
| 7,313,571 B1 | 12/2007 | Platt et al. |
| 7,313,814 B2 | 12/2007 | Zhu et al. |
| 7,333,092 B2 | 2/2008 | Zadesky et al. |
| 7,363,361 B2 | 4/2008 | Tewari et al. |
| 7,373,144 B1 | 5/2008 | Kirkpatrick et al. |
| 7,373,644 B2 | 5/2008 | Aborn |
| 7,409,556 B2 | 8/2008 | Wu et al. |
| 7,412,325 B1 | 8/2008 | Tannenbaum et al. |
| 7,426,537 B2 | 9/2008 | Lee et al. |
| 7,444,413 B2 | 10/2008 | Saxena |
| 7,483,958 B1 | 1/2009 | Elabbady et al. |
| 7,546,641 B2 | 6/2009 | Robert et al. |
| 7,548,934 B1 | 6/2009 | Platt et al. |
| 7,567,721 B2 | 7/2009 | Alattar et al. |
| 7,636,509 B2 | 12/2009 | Davis |
| 7,668,939 B2 | 2/2010 | Encarnacion et al. |
| 7,680,814 B2 | 3/2010 | Mercer et al. |
| 7,680,959 B2 | 3/2010 | Svendsen |
| 7,684,815 B2 | 3/2010 | Counts et al. |
| 7,685,210 B2 | 3/2010 | Plastina et al. |
| 7,689,510 B2 | 3/2010 | Lamkin et al. |
| 7,696,427 B2 | 4/2010 | West et al. |
| 7,702,728 B2 | 4/2010 | Zaner et al. |
| 7,730,216 B1 | 6/2010 | Issa et al. |
| 7,730,527 B2 | 6/2010 | Charles et al. |
| 7,747,620 B2 | 6/2010 | Beaupre |
| 7,752,265 B2 | 7/2010 | Svendsen et al. |
| 7,769,894 B2 | 8/2010 | Matz |
| 7,779,097 B2 | 8/2010 | Lamkin et al. |
| 7,792,756 B2 | 9/2010 | Plastina et al. |
| 7,840,620 B2 | 11/2010 | Vignoli et al. |
| 7,853,712 B2 | 12/2010 | Amidon et al. |
| 7,917,557 B2 | 3/2011 | Shteyn et al. |
| 8,059,646 B2 | 11/2011 | Svendsen et al. |
| 8,224,899 B2 | 7/2012 | Svendsen et al. |
| 8,285,810 B2 | 10/2012 | Svendsen et al. |
| 8,285,811 B2 | 10/2012 | Svendsen et al. |
| 8,583,671 B2 * | 11/2013 | Martin et al. ............... 707/765 |
| 2001/0012303 A1 | 8/2001 | Gruse et al. |
| 2002/0029384 A1 | 3/2002 | Griggs |
| 2002/0051540 A1 | 5/2002 | Glick et al. |
| 2002/0069278 A1 | 6/2002 | Forslow |
| 2002/0072326 A1 | 6/2002 | Qureshey et al. |
| 2003/0023578 A1 | 1/2003 | Durand et al. |
| 2003/0032419 A1 | 2/2003 | Shibasaki et al. |
| 2003/0037157 A1 | 2/2003 | Pestoni et al. |
| 2003/0088677 A1 | 5/2003 | Yamamoto |
| 2003/0093790 A1 | 5/2003 | Logan et al. |
| 2003/0110510 A1 | 6/2003 | Gong et al. |
| 2003/0130953 A1 | 7/2003 | Narasimhan et al. |
| 2003/0135608 A1 | 7/2003 | Bodin et al. |
| 2003/0167295 A1 | 9/2003 | Choo |
| 2003/0191946 A1 | 10/2003 | Auer et al. |
| 2003/0195808 A1 | 10/2003 | Brown et al. |
| 2003/0212804 A1 | 11/2003 | Hashemi |
| 2003/0217163 A1 | 11/2003 | Lagerweij et al. |
| 2003/0227478 A1 | 12/2003 | Chatfield |
| 2004/0042599 A1 | 3/2004 | Zaner et al. |
| 2004/0193902 A1 | 9/2004 | Vogler et al. |
| 2005/0038876 A1 | 2/2005 | Chaudhuri |
| 2005/0050027 A1 | 3/2005 | Yeh et al. |
| 2005/0060350 A1 | 3/2005 | Baum et al. |
| 2005/0097595 A1 | 5/2005 | Lipsanen et al. |
| 2005/0131894 A1 | 6/2005 | Vuong |
| 2005/0149480 A1 | 7/2005 | Deshpande |
| 2005/0149508 A1 | 7/2005 | Deshpande |
| 2005/0154608 A1 | 7/2005 | Paulson et al. |
| 2005/0163300 A1 | 7/2005 | Kawakami et al. |
| 2005/0177614 A1 | 8/2005 | Bourne |
| 2005/0185795 A1 | 8/2005 | Song et al. |
| 2005/0198031 A1 | 9/2005 | Pezaris et al. |
| 2005/0212767 A1 | 9/2005 | Marvit et al. |
| 2005/0221841 A1 | 10/2005 | Piccionelli et al. |
| 2005/0234735 A1 | 10/2005 | Williams |
| 2005/0240494 A1 | 10/2005 | Cue et al. |
| 2005/0243979 A1 | 11/2005 | Starbuck et al. |
| 2005/0251565 A1 | 11/2005 | Weel |
| 2005/0251576 A1 | 11/2005 | Weel |
| 2005/0256870 A1 | 11/2005 | Benco et al. |
| 2005/0262246 A1 | 11/2005 | Menon et al. |
| 2005/0272413 A1 | 12/2005 | Bourne |
| 2005/0273848 A1 | 12/2005 | Charles et al. |
| 2006/0004631 A1 | 1/2006 | Roberts et al. |
| 2006/0008256 A1 | 1/2006 | Khedouri et al. |
| 2006/0029040 A1 | 2/2006 | Sherman et al. |
| 2006/0042483 A1 | 3/2006 | Work et al. |
| 2006/0044466 A1 | 3/2006 | Kelly et al. |
| 2006/0059096 A1 | 3/2006 | Dublish et al. |
| 2006/0069998 A1 | 3/2006 | Artman et al. |
| 2006/0085419 A1 | 4/2006 | Rosen |
| 2006/0087926 A1 | 4/2006 | Hwang |
| 2006/0143236 A1 | 6/2006 | Wu |
| 2006/0156347 A1 | 7/2006 | Zhang et al. |
| 2006/0159109 A1 * | 7/2006 | Lamkin et al. ............... 370/401 |
| 2006/0161871 A1 | 7/2006 | Hotelling et al. |
| 2006/0167956 A1 | 7/2006 | Chasen et al. |
| 2006/0179078 A1 | 8/2006 | McLean |
| 2006/0195515 A1 | 8/2006 | Beaupre et al. |
| 2006/0195902 A1 | 8/2006 | King et al. |
| 2006/0212478 A1 | 9/2006 | Plastina et al. |
| 2006/0218225 A1 | 9/2006 | Hee Voon et al. |
| 2006/0218613 A1 | 9/2006 | Bushnell |
| 2006/0229058 A1 | 10/2006 | Rosenberg |
| 2006/0240856 A1 | 10/2006 | Counts et al. |
| 2006/0242106 A1 | 10/2006 | Bank |
| 2006/0245367 A1 | 11/2006 | Jeffery et al. |
| 2006/0265349 A1 | 11/2006 | Hicken |
| 2006/0265467 A1 | 11/2006 | Jang |
| 2006/0287813 A1 | 12/2006 | Quigley |
| 2007/0025194 A1 | 2/2007 | Morse et al. |
| 2007/0031109 A1 | 2/2007 | Tsuboi et al. |
| 2007/0033225 A1 | 2/2007 | Davis |
| 2007/0038647 A1 | 2/2007 | Thomas et al. |
| 2007/0047519 A1 | 3/2007 | Bangor et al. |
| 2007/0048713 A1 | 3/2007 | Plastina et al. |
| 2007/0048714 A1 | 3/2007 | Plastina et al. |
| 2007/0061416 A1 | 3/2007 | Gould |
| 2007/0083556 A1 | 4/2007 | Plastina et al. |
| 2007/0113081 A1 | 5/2007 | Camp |
| 2007/0121843 A1 | 5/2007 | Atazky et al. |
| 2007/0126859 A1 | 6/2007 | Choi et al. |
| 2007/0127423 A1 | 6/2007 | Ho |
| 2007/0130153 A1 | 6/2007 | Nachman et al. |

(56) References Cited

U.S. PATENT DOCUMENTS

| | | |
|---|---|---|
| 2007/0168544 A1 | 7/2007 | Sciammarella |
| 2007/0168554 A1 | 7/2007 | Dinger et al. |
| 2007/0180496 A1 | 8/2007 | Fransdonk |
| 2007/0192276 A1 | 8/2007 | Lee et al. |
| 2007/0196802 A1 | 8/2007 | Beletski et al. |
| 2007/0201502 A1 | 8/2007 | Abramson |
| 2007/0206736 A1 | 9/2007 | Sprigg et al. |
| 2007/0218980 A1 | 9/2007 | Pachnis et al. |
| 2007/0220081 A1 | 9/2007 | Hyman |
| 2007/0234213 A1 | 10/2007 | Krikorian et al. |
| 2007/0239778 A1 | 10/2007 | Gallagher |
| 2007/0244856 A1 | 10/2007 | Plastina et al. |
| 2007/0244880 A1* | 10/2007 | Martin et al. ............... 707/5 |
| 2007/0255807 A1 | 11/2007 | Hayashi et al. |
| 2007/0266001 A1 | 11/2007 | Williams et al. |
| 2007/0276826 A1 | 11/2007 | Chand et al. |
| 2007/0281689 A1 | 12/2007 | Altman et al. |
| 2007/0282621 A1 | 12/2007 | Altman et al. |
| 2007/0282949 A1 | 12/2007 | Fischer et al. |
| 2007/0297426 A1 | 12/2007 | Haveson et al. |
| 2007/0299681 A1 | 12/2007 | Plastina et al. |
| 2008/0002022 A1 | 1/2008 | VanEpps |
| 2008/0005072 A1 | 1/2008 | Meek et al. |
| 2008/0005125 A1 | 1/2008 | Gaedeke |
| 2008/0005179 A1 | 1/2008 | Friedman et al. |
| 2008/0008252 A1 | 1/2008 | Xu et al. |
| 2008/0016205 A1 | 1/2008 | Svendsen |
| 2008/0022003 A1 | 1/2008 | Alve |
| 2008/0033809 A1 | 2/2008 | Black et al. |
| 2008/0040475 A1 | 2/2008 | Bosworth et al. |
| 2008/0045189 A1 | 2/2008 | Kim et al. |
| 2008/0046976 A1 | 2/2008 | Zuckerberg |
| 2008/0051071 A1 | 2/2008 | Vishwanathan et al. |
| 2008/0052349 A1 | 2/2008 | Lin |
| 2008/0052371 A1 | 2/2008 | Partovi et al. |
| 2008/0059992 A1 | 3/2008 | Amidon et al. |
| 2008/0066176 A1 | 3/2008 | Hamid |
| 2008/0080392 A1 | 4/2008 | Walsh et al. |
| 2008/0086261 A1 | 4/2008 | Robinson et al. |
| 2008/0086431 A1 | 4/2008 | Robinson et al. |
| 2008/0088698 A1 | 4/2008 | Patel et al. |
| 2008/0091717 A1 | 4/2008 | Garbow et al. |
| 2008/0092201 A1 | 4/2008 | Agarwal et al. |
| 2008/0095450 A1 | 4/2008 | Kirenko |
| 2008/0101604 A1 | 5/2008 | Kocher et al. |
| 2008/0103907 A1 | 5/2008 | Maislos et al. |
| 2008/0104122 A1 | 5/2008 | Hempleman et al. |
| 2008/0109888 A1 | 5/2008 | Ullah |
| 2008/0117295 A1 | 5/2008 | Ebrahimi et al. |
| 2008/0132175 A1 | 6/2008 | Loeb et al. |
| 2008/0133441 A1 | 6/2008 | West et al. |
| 2008/0133759 A1 | 6/2008 | Weel |
| 2008/0147711 A1 | 6/2008 | Spiegelman et al. |
| 2008/0147798 A1 | 6/2008 | Paalasmaa et al. |
| 2008/0148363 A1 | 6/2008 | Gilder et al. |
| 2008/0154780 A1 | 6/2008 | Soukup et al. |
| 2008/0154798 A1 | 6/2008 | Valz |
| 2008/0154967 A1 | 6/2008 | Heikes et al. |
| 2008/0155057 A1 | 6/2008 | Khedouri et al. |
| 2008/0176511 A1 | 7/2008 | Tan et al. |
| 2008/0184317 A1 | 7/2008 | Khedouri et al. |
| 2008/0186962 A1 | 8/2008 | Sinha |
| 2008/0189617 A1 | 8/2008 | Covell et al. |
| 2008/0205205 A1 | 8/2008 | Chiang et al. |
| 2008/0208823 A1 | 8/2008 | Hicken |
| 2008/0209577 A1 | 8/2008 | Vrielink et al. |
| 2008/0222188 A1 | 9/2008 | Watson et al. |
| 2008/0256032 A1 | 10/2008 | Vignoli et al. |
| 2008/0259154 A1 | 10/2008 | Garrison et al. |
| 2008/0281507 A1 | 11/2008 | Bergman |
| 2008/0318560 A1 | 12/2008 | Reifman |
| 2009/0005040 A1 | 1/2009 | Bourne |
| 2009/0012706 A1 | 1/2009 | Kim |
| 2009/0019156 A1 | 1/2009 | Mo et al. |
| 2009/0037005 A1 | 2/2009 | Larsen et al. |
| 2009/0041311 A1 | 2/2009 | Hundley |
| 2009/0044278 A1 | 2/2009 | Lim |
| 2009/0055922 A1 | 2/2009 | Kotzin |
| 2009/0060467 A1 | 3/2009 | Grigsby et al. |
| 2009/0063975 A1 | 3/2009 | Bull et al. |
| 2009/0070334 A1 | 3/2009 | Callahan et al. |
| 2009/0070438 A1 | 3/2009 | Bartholomew |
| 2009/0077129 A1 | 3/2009 | Blose |
| 2009/0080635 A1 | 3/2009 | Altberg et al. |
| 2009/0083117 A1 | 3/2009 | Svendsen et al. |
| 2009/0092237 A1 | 4/2009 | Chang et al. |
| 2009/0094317 A1 | 4/2009 | Venkitaraman |
| 2009/0094330 A1 | 4/2009 | McQuaide, Jr. et al. |
| 2009/0094531 A1 | 4/2009 | Danieli et al. |
| 2009/0138505 A1 | 5/2009 | Purdy |
| 2009/0157304 A1 | 6/2009 | Zhe et al. |
| 2009/0164199 A1 | 6/2009 | Amidon et al. |
| 2009/0164452 A1 | 6/2009 | Yogaratnam et al. |
| 2009/0164600 A1 | 6/2009 | Issa et al. |
| 2009/0165356 A1 | 7/2009 | Blum |
| 2009/0177654 A1 | 7/2009 | Beaupre et al. |
| 2009/0180621 A1 | 7/2009 | Kratz et al. |
| 2009/0193338 A1 | 7/2009 | Fiatal |
| 2009/0196302 A1 | 8/2009 | Pastorino et al. |
| 2009/0216859 A1 | 8/2009 | Dolling |
| 2009/0217352 A1 | 8/2009 | Shen et al. |
| 2009/0222392 A1 | 9/2009 | Martin et al. |
| 2009/0228774 A1* | 9/2009 | Matheny et al. ............... 715/201 |
| 2009/0234909 A1 | 9/2009 | Strandell et al. |
| 2009/0249222 A1 | 10/2009 | Schmidt et al. |
| 2009/0254643 A1 | 10/2009 | Terheggen et al. |
| 2009/0256870 A1 | 10/2009 | Nakamura |
| 2009/0259539 A1 | 10/2009 | Dawson et al. |
| 2009/0265218 A1 | 10/2009 | Amini et al. |
| 2009/0265356 A1 | 10/2009 | Hyman et al. |
| 2009/0265417 A1 | 10/2009 | Svendsen et al. |
| 2009/0265418 A1 | 10/2009 | Svendsen et al. |
| 2009/0265426 A1 | 10/2009 | Svendsen et al. |
| 2009/0307361 A1 | 12/2009 | Issa et al. |
| 2009/0326970 A1 | 12/2009 | Estrada et al. |
| 2009/0328087 A1 | 12/2009 | Higgins et al. |
| 2010/0015975 A1 | 1/2010 | Issa et al. |
| 2010/0015976 A1 | 1/2010 | Issa et al. |
| 2010/0023578 A1 | 1/2010 | Brant et al. |
| 2010/0037752 A1 | 2/2010 | Hansson et al. |
| 2010/0049827 A1* | 2/2010 | Turner ............... 709/217 |
| 2010/0066599 A1 | 3/2010 | Liu et al. |
| 2010/0070490 A1 | 3/2010 | Amidon et al. |
| 2010/0070537 A1 | 3/2010 | Amidon et al. |
| 2010/0071070 A1 | 3/2010 | Jawa et al. |
| 2010/0082135 A1 | 4/2010 | Amidon et al. |
| 2010/0082488 A1 | 4/2010 | Evans et al. |
| 2010/0094833 A1 | 4/2010 | Svendsen |
| 2010/0094834 A1 | 4/2010 | Svendsen |
| 2010/0094934 A1 | 4/2010 | Svendsen et al. |
| 2010/0094935 A1 | 4/2010 | Svendsen et al. |
| 2010/0107117 A1 | 4/2010 | Pearce et al. |
| 2010/0114979 A1 | 5/2010 | Petersen |
| 2010/0115553 A1 | 5/2010 | Van Flandern et al. |
| 2010/0125410 A1 | 5/2010 | Hicks |
| 2010/0134647 A1 | 6/2010 | Orboubadian |
| 2010/0146091 A1 | 6/2010 | Curtis et al. |
| 2010/0146135 A1 | 6/2010 | Evans et al. |
| 2010/0169279 A1* | 7/2010 | Loi et al. ............... 707/640 |
| 2010/0186034 A1 | 7/2010 | Walker |
| 2010/0197318 A1 | 8/2010 | Petersen et al. |
| 2010/0197319 A1 | 8/2010 | Petersen et al. |
| 2010/0198818 A1 | 8/2010 | McLaughlin |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0227594 A1 | 9/2010 | De Vries |
| 2010/0232431 A1* | 9/2010 | Sebastian ............... 370/390 |
| 2011/0004840 A1 | 1/2011 | Feinberg et al. |
| 2011/0060994 A1 | 3/2011 | Maxwell et al. |
| 2011/0066646 A1 | 3/2011 | Danado et al. |
| 2011/0145327 A1 | 6/2011 | Stewart |

(56) References Cited

U.S. PATENT DOCUMENTS

| | | | |
|---|---|---|---|
| 2011/0208831 A1* | 8/2011 | Ho et al. | 709/217 |
| 2011/0214124 A1* | 9/2011 | Ferris et al. | 718/1 |
| 2011/0246572 A1* | 10/2011 | Kollenkark et al. | 709/204 |
| 2011/0258560 A1* | 10/2011 | Mercuri et al. | 715/753 |
| 2011/0264495 A1* | 10/2011 | Hailey et al. | 705/14.16 |
| 2011/0295727 A1* | 12/2011 | Ferris et al. | 705/34 |
| 2012/0023430 A1 | 1/2012 | Amidon et al. | |
| 2012/0036494 A1* | 2/2012 | Gurumohan et al. | 717/106 |
| 2012/0095962 A1* | 4/2012 | Goldman et al. | 707/634 |
| 2012/0113964 A1 | 5/2012 | Petersen et al. | |
| 2012/0117110 A1 | 5/2012 | Amidon et al. | |
| 2012/0117832 A1 | 5/2012 | Mueller | |
| 2012/0259737 A1 | 10/2012 | Pousti et al. | |

FOREIGN PATENT DOCUMENTS

| | | |
|---|---|---|
| WO | WO 2007/069004 | 6/2007 |
| WO | WO 2007/137626 | 12/2007 |
| WO | WO 2007/140321 | 12/2007 |
| WO | WO 2009/149437 | 12/2009 |
| WO | WO 2010/030392 | 3/2010 |
| WO | WO 2010/093275 | 8/2010 |

OTHER PUBLICATIONS

"4G," Wikipedia, at <htpp://en.wikipedia.org/wiki4G>, as revised Apr. 23, 2008, printed Dec. 12, 2011, 1 page.
Abstract, Tanaka, K. et al., "A destination prediction method using driving contexts and trajectory for car navigation systems," Proc. of the 2009 ACM symposium on Applied Computing (SAC'09), Mar. 9-12, 2009, Honolulu, Hawaii, pp. 190-195, ACM, New York, New York, 2009, 3 pages.
"A Music Revolution . . . SoundServer," imerge, date unknown but obtained on or prior to Dec. 28, 2007, 2 pages.
Peer, Nir J., "AlwaySocial: Social Networking in the Real World," at <http://www.cs.umd.edu/Grad/scholarlypapers/papers/NirPeer.pdf>, Department of Computer Science, University of Maryland, College Park, Maryland, 2008, 6 pages.
Kevin C. Almeroth et al., "An Alternative Paradigm for Scalable On-Demand Applications: Evaluating and Deploying the Interactive Multimedia Jukebox," IEEE Transactions on Knowledge and Data Engineering, vol. 11, No. 4, Jul./Aug. 1999, pp. 658-672, copyright 1999 IEEE, 15 pages.
Dou, Yufeng et al., "An Approach to Analyzing Correlation between Songs/Artists Using iTMS Playlists," Proceedings of the International Conference on Computational Intelligence for Modelling, Control and Automation and International Conference on Intelligent Agents, Web Technologies and Internet Commerce vol. 1 (CIMCA-IAWTIC'06), vol. 1, pp. 951-956, 2005, 6 pages.
"Apple—iTunes—What is iTunes?—A player, a store, and more," at <http://www.apple.com/itunes/whatis/>, printed Aug. 11, 2009, 2 pages.
"BlueCastWiFi," <http://www.bluecasting.com/prodserv.html>.
"Celtius XDM Server," copyright 2007, Celtius Ltd., originally found at <http://www.celtius.com/s.asp?p=494>, found at Internet Archive, dated Oct. 9, 2007, printed Apr. 28, 2011, 2 pages.r.
Feng-Cheng Chang et al., "Combined Encryption and Watermarking Approaches for Scalable Multimedia Coding," PCM 2004, LNCS 3333, 2004, Springer-Verlang Berlin Heidelberg 2004, 8 pages.
Shin, S., Combined Scheme of Encryption and Watermarking in H.264/Scalable Video Coding (SVC), in New Directions in Intelligent Interactive Multimedia, vol. 142 of Studies in Computational Intelligence, pp. 351-361, Springer, Berlin/Heidelberg, Sep. 9, 2008, 3 pages.
"Content-Based Access Control," author unknown but likely Hart, M., Johnson, R., and Stent, A. in 2006, found on webpage of Michael Hart, PhD candidate at Stony Brook University of Stony Brook, NY, at <http://www.cs.sunysb.edu/%7Emhart/cbac.pdf>, found Apr. 13, 2009, 11 pages.

Kasenna, "Deploying Network-Based PVR Services," Sep. 2004, copyright 2004, Kasenna, Inc., found at <http://www.kasenna.com/downloads/white_papers/Kasenna_NPVR_TimelessTV_White_Paper.pdf>, pp. 1-12.
Kincaid, Jason, "Dial Plus Fetches Information as You Talk," Apr. 18, 2008, at <http://www.techcrunch.com/2008/04/18/dial-plus-fetches-information-as-you-talk/>, printed Nov. 17, 2011, 2 pages.
"DialPlus—P2P," at <http://www.dialplus.net/productp2p.html>, copyright 2008, Dialplus, Inc., printed Apr. 24, 2008, 1 page.
"Digital rights management," at <http://en.wikipedia.org/wiki/Digital_rights_management>, includes information dating back to 1998, page last modified Apr. 16, 2011, printed Apr. 21, 2011, 21 pages.
Raivio, Yrjo et al., "Digital Rights Management in the Mobile Environment," ICE-B International Conference on E-Business, Aug. 7-10, 2006, Setubal, Portugal, pp. 182-185.
"DNS Service Discovery (DNS-SD)," at <http://www.dns-sd.org/>, printed May 18, 2010, 4 pages.
"Exclusive: Windows Mobile 7 to Focus on Touch and Motion Gestures," posted by Nathan Weinberg, Windows Mobile, Jan. 6, 2008, InsideMicrosoft—part of the Blog News Channel, originally found at <http://microsoft.blognewschannel.com/archives/2008/01/06/exclusive-windows-mobile-7-to-focus-on-touc h-and-motion-gestures/>, obtained from Internet Archive, printed Apr. 8, 2011, 34 pages.
Muster, Richard T., Captain, USAF, "Exploitation of Geographic Information Systems for Vehicular Destination Prediction," Masters Thesis, Department of Electrical Engineering and Computer Science, Graduate School of Engineering and Management, Air Force Institute of Technology, Air University, Wright-Patterson Air Force Base, Ohio, Mar. 2009, found at <http://www.dtic.mil/cgi-bin/GetTRDoc?AD=ADA499514>, 205 pages.
"Firefly Media Server :: Home Page," at <http://www.fireflymediaserver.org/>, printed Feb. 3, 2009, 1 page.
"FLUTE—File Delivery over Unidirectional Transport," Oct. 2004, copyright 2004, The Internet Society, at <http://tools.ietf.org/html/rfc3926>, printed Apr. 19, 2011, 36 pages.
Quercia, D. and Capra, L., "FriendSensing: Recommending Friends Using Mobile Phones," In Proceedings of RecSys '09, Oct. 23-25, 2009, New York, New York, found at <http://eprints.ucl.ac.uk/16835/1/16835.pdf>, 8 pages.
Pering, T. et al. "Gesture Connect: Facilitating Tangible Interaction With a Flick of the Wrist," Proceedings of the 1st International Conference on Tangible and Embedded Interaction (TEI) 2007, Feb. 15-17, 2007 Baton Rouge, Louisiana, ACM, New York, New York, originally found at <http://www.cs.washington.edu/homes/yanokwa/papers/anokwa_gestureconnect.pdf>, obtained from the Internet Archive, 4 pages.
"How to Share Files in Windows XP," at <http://compnetworking.about.com/od/windo...>, from Internet Archive dated Mar. 31, 2006, printed Feb. 26, 2012, 2 pages.
"Infrared Data Association Releases IrDA Global Market Report 2007," Infrared Data Association, 2007, at <http://www.irda.org/displaycommon.cfm?an=1&subarticlenbr=17>, printed Apr. 8, 2011, 1 page.
"IPv6," Wikipedia, at http://en.wikiPedie.org/wiki/IPv6>, includes information that dates back to the early 1980s, page last modified Apr. 18, 2011, printed Apr. 21, 2011, 16 pages.
Meola, R., "IR Communication: Beyond Cell Phones and PDAs," Nov. 13, 2006, Dr. Dobb's, at <http://drdobbs.com/mobility/194300336>, printed Apr. 8, 2011, 3 pages.
"Libox—About us," at http://www.libox.com/about/>, from the Internet Archive, dated Oct. 26, 2009, copyright 2009, Libox, printed Apr. 19, 2012, 1 page.
"LimeWire User Manual," copyright 2000-2005, limewire, 24 pages.
"LinkedIn: Relationships Matter," at <http://www.linkedin.com/>, date unknown but website dates back to at least 2003, copyright 2009, LinkedIn Corportaion, printed Jan. 22, 2009, 1 page.
Chen, Brian X., "LinkedIn iPhone App Gets Revamped UI," Dec. 30, 2009, found at <http://www.wired.com/gadgetlab/2009/12/linkedin-iphone-app- gets-revamped-ui/>, printed Nov. 1, 2011, 2 pages.
Shanahan, Kevin P. and Freedman, Michael J., "Locality Prediction for Oblivious Clients," In Proc. of the International Workshop on

(56) References Cited

OTHER PUBLICATIONS

Peer-to-Peer Systems (IPTPS), Feb. 24-25, 2005, Ithaca, New York, found at <http://cs.brown.edu/courses/cs296-2/papers/netmap.pdf>, 6 pages.

Ripeanu et al., "Mapping the Gnutella Network: Properties of Large-Scale Peer-to-Peer Systems and Implications for System Design," IEEE Internet Computing Journal, 6(1), 2002, 12 pages.

"Microsoft Windows XP tutorial free. Unit 4 Windows Explorer," at <http://www.teacherclick.com/winxp/t_4_1.htm>, copyright Nov. 2005, aulaClic, printed Feb. 26, 2012, 4 pages.

Pietilainen, A-K et al., "MobiClique: Middleware for Mobile Social Networking," In Proceedings of WOSN '09, Aug. 17, 2009, Barcelona, Spain, found at <http://conferences.sigcomm.org/sigcomm/2009/workshops/wosn/papers/p49.pdf>, 6 pages.

"Multicast," Wikipedia, at <http://en.wikipedia.org/wiki/Multicast>, includes information that dates back to 2005, page last modified Mar. 26, 2011, printed Apr. 21, 2011, 5 pages.

Wu et al., "Next Generation Mobile Multimedia Communications: Media Codec and Media Transport Perspectives," China Communications, Oct. 2006, 15 pages.

"Our Company | mSpot," at <http://www.mspotcorporate.com/>, from the Internet Archive, dated May 14, 2010, copyright 2010, mSpot, Incorporated, printed Apr. 19, 2012, 3 pages.

Wiegand, T. et al., "Overview of the H.264/AVC Video Coding Standard," IEEE Transactions on Circuits and Systems for Video Technology, vol. 13, No. 7, Jul. 2003, IEEE, pp. 560-576, 17 pages.

Tallberg, Mathias, "P2P-Based Roaming Between Home WLAN Hotspots," from <http://whitepaper.techworld.com/wireless-networking-wlan-wi-fi/4587/p2p-based-roaming-between-home-wlan-hotspots/>, Mar. 1, 2007, 6 pages.

Ratiu, Florin, "People You May Know—Facebook," at http://ja-jp.facebook.com/blog.php?post=15610312130>, posted May 1, 2008, printed Oct. 3, 2011, 4 pages.

Krumm, J. and Horvitz, E., "Predestination: Inferring Destinations from Partial Trajectories," UbiComp 2006, Sep. 17-21, 2006, Orange County, California, 18 pages.

Hsiang-Chew Huang et al., "Progressive Watermarking Techniques Using Genetic Algorithms," Circuits Systems Signal Processing, vol. 26, No. 5, pp. 671-687, Oct. 24, 2007.

"RTP, Real-time Transport Protocol," at <http://www.networksorcery.com/enp/protocol/rtp.htm>, copyright 1998-2011, Network Sorcery, Inc., printed Apr. 19, 2011, 13 pages.

Zahariadis, Theodore et al., "Scalable Content Delivery Over P2P Convergent Networks," 12th IEEE International Symposium on Consumer Electronics, (ISCE 2008), Vilamoura, Portugal, Apr. 14-16, 2008, 4 pages.

Dapeng Wu et al., "Scalable Video Coding and Transport over Broad-Band Wireless Networks," Proceedings of the IEEE, vol. 89, No. 1, pp. 6-20, Jan. 2001.

"Skype official website—free download and free calls and internet calls," at <http://www.skype.com/>, date unknown but website dates back to at least 2003, copyright 2009, Skype Limited, printed Jan. 22, 2009, 1 page.

Meerwald, P. and Uhl, A., "Toward robust watermarking of scalable video," In Proceedings of SPIE, Security, Forensics, Steganography, and Watermarking of Multimedia Contents X, San Jose, California, Jan. 27-31, 2008, vol. 6819, published Mar. 18, 2008, SPIE, 12 pages.

Abstract, Alvarez-Garcia, J.A. at al., "Trip destination prediction based on past GPS log using a Hidden Markov Model," Expert Systems with Applications, vol. 37, Issue 12, Dec. 2010, Elsevier Ltd, pp. 8166-8171, available online Jun. 2, 2010, 3 pages.

Oliver, Mark, "Tutorial; The H.264 Scalable Video Codec (SVC)," EE Times, Mar. 10, 2008, at <http://www.eetimes.com/design/signal-processing-dsp/4017613/Tutorial-The-H-264-Scalable-Video-Codec-SVC->, printed May 25, 2011, 7 pages.

Hua, K.A. et al., "Video Delivery Technologies for Large-Scale Deployment of Multimedia Applications," Proceedings of the IEEE, vol. 92, No. 9, Sep. 2004, pp. 1439-1451, 13 pages.

"Welcome to Facebook!—Facebook," at http://www.facebook.com/, copyright 2008, Facebook, printed Jan. 9, 2008, 1 page.

\* cited by examiner

METHOD AND SYSTEM FOR AGGREGATING MUSIC IN THE CLOUD

This application claims the benefit of provisional patent application Ser. No. 61/387,728, filed Sep. 29, 2010, the disclosure of which is hereby incorporated herein by reference in its entirety.

RELATED APPLICATIONS

This application is related to U.S. patent application Ser. No. 13/172,212, entitled DYNAMIC LOCATION-BASED MEDIA COLLECTION AGGREGATION, which was filed Jun. 29, 2011, the disclosure of which is hereby incorporated herein by reference in its entirety.

FIELD OF THE DISCLOSURE

The present disclosure relates to aggregating media collection catalogs of users.

BACKGROUND

Today, applications such as Apple® iTunes® enable users to share their media collections over a Local Area Network (LAN). However, these applications have significant shortcomings in that they are restricted by the network boundaries of the LAN. For example, once a user device is disconnected from the LAN, the media items stored by that user device are no longer accessible to the other user devices connected to the LAN. Likewise, the user device that has disconnected from the LAN no longer has access to the media items stored by the other user devices that are connected to the LAN. Thus, there is a need for a system and method for sharing media collections that are not limited by network boundaries.

SUMMARY

The present disclosure relates to cloud-based systems and methods for aggregating media collections of users. In one embodiment, in order to generate an aggregate media collection catalog of a first user, a cloud-based media aggregation system identifies one or more second users that have an identifier that is the same as an identifier of the first user for purposes of media collection aggregation. The media aggregation system then aggregates media collection catalogs of the one or more second users with a media collection catalog of the first user to thereby provide an aggregate media collection catalog of the first user.

In another embodiment, in order to generate an aggregate media collection catalog of a first user, a cloud-based media aggregation system identifies one or more second users that have a same base network as the first user for purposes of media collection aggregation. In one embodiment, the base network is a Local Area Network (LAN). The media aggregation system then aggregates media collection catalogs of the one or more second users with a media collection catalog of the first user regardless of whether user devices of the first user and the one or more second users are connected to the base network to thereby provide an aggregate media collection catalog of the first user.

In one embodiment, after generating the aggregate media collection catalog of the first user, the media aggregation system stores the aggregate media collection catalog of the first user. In addition or alternatively, the media aggregation system sends the aggregate media collection catalog of the first user to the user device of the first user for utilization at the first user's user device. For example, the user device may play media items listed in the aggregate media collection catalog, create a playlist of media items listed in the aggregate media collection catalog, enable the first user to browse media items in the aggregate media collection catalog, enable the first user to select a media item from the aggregate media collection catalog for playback, enable the first user to create a playlist of media items from the aggregate media collection catalog, enable the first user to purchase media items in the aggregate media collection catalog, and/or the like.

In another embodiment, a cloud-based media aggregation system determines that a first user and one or more second users are geographically proximate to one another. In response, the media aggregation system dynamically aggregates at least a portion of media collection catalogs of the one or more second users with a media collection catalog of the first user to provide an aggregate media collection catalog of the first user. The media aggregation system may control an extent of the aggregation based on pre-defined criteria. In one embodiment, the aggregate media collection catalog is stored. In addition or alternatively, the aggregate media collection catalog is sent to a user device of the first user for utilization by the user device of the first user. In one embodiment, the media collection catalogs of the one or more second users are retained in the aggregate media collection catalog of the first user at least temporarily after the first user and the one or more second users are no longer geographically proximate to one another.

In yet another embodiment, a cloud-based media aggregation system determines that a user device of a first user and user devices of one or more second users are connected to the same Local Area Network (LAN). In response, the media aggregation system dynamically aggregates at least a portion of media collection catalogs of the one or more second users with a media collection catalog of the first user to provide an aggregate media collection catalog of the first user. The media aggregation system may control an extent of the aggregation based on pre-defined criteria. In one embodiment, the aggregate media collection catalog is stored. In addition or alternatively, the aggregate media collection catalog is sent to a user device of the first user for utilization by the user device of the first user. In one embodiment, the media collection catalogs of the one or more second users are retained in the aggregate media collection catalog of the first user at least temporarily after the user device of the first user disconnects from the LAN.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 1:
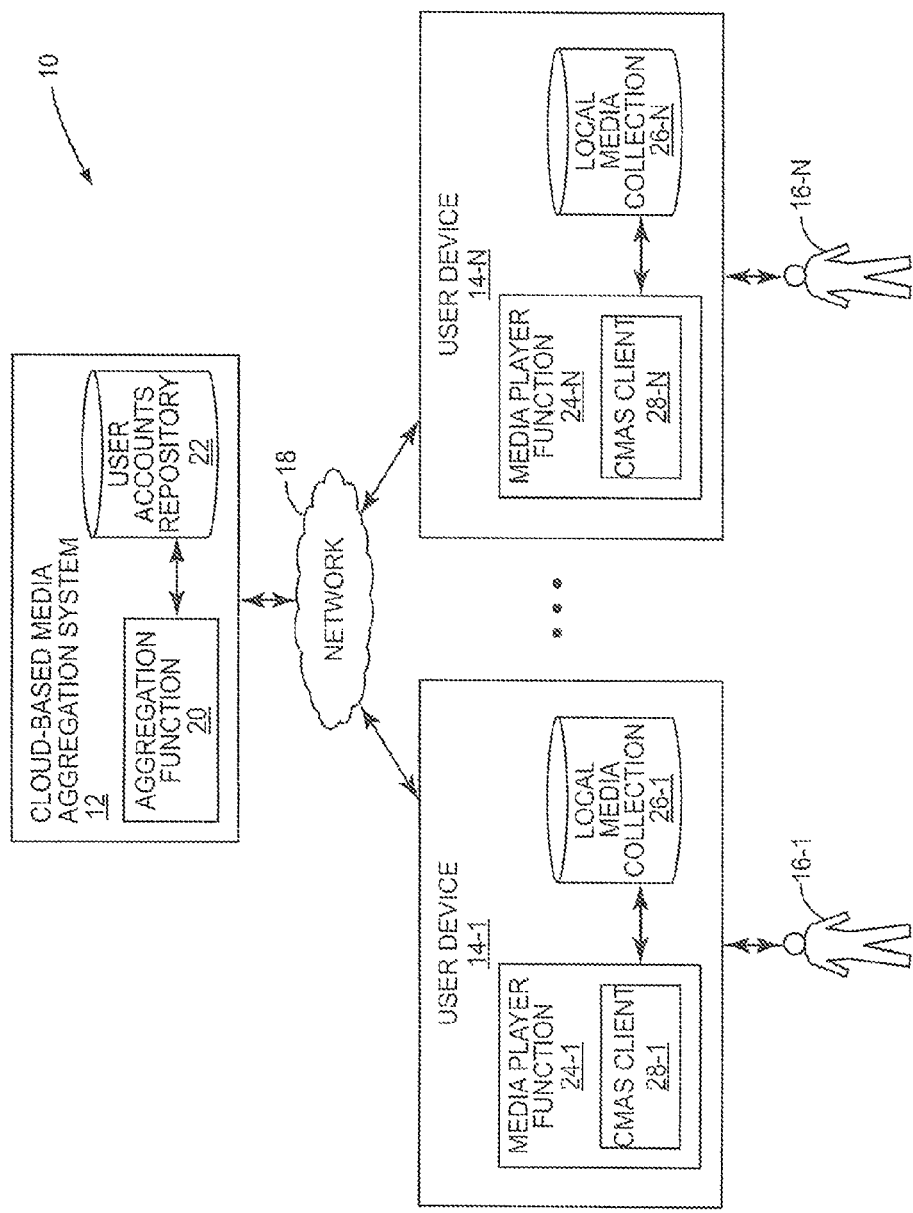
FIG. 1 illustrates a Cloud-based Media Aggregation System (CMAS) according to one embodiment of the present disclosure.
Figure 4:
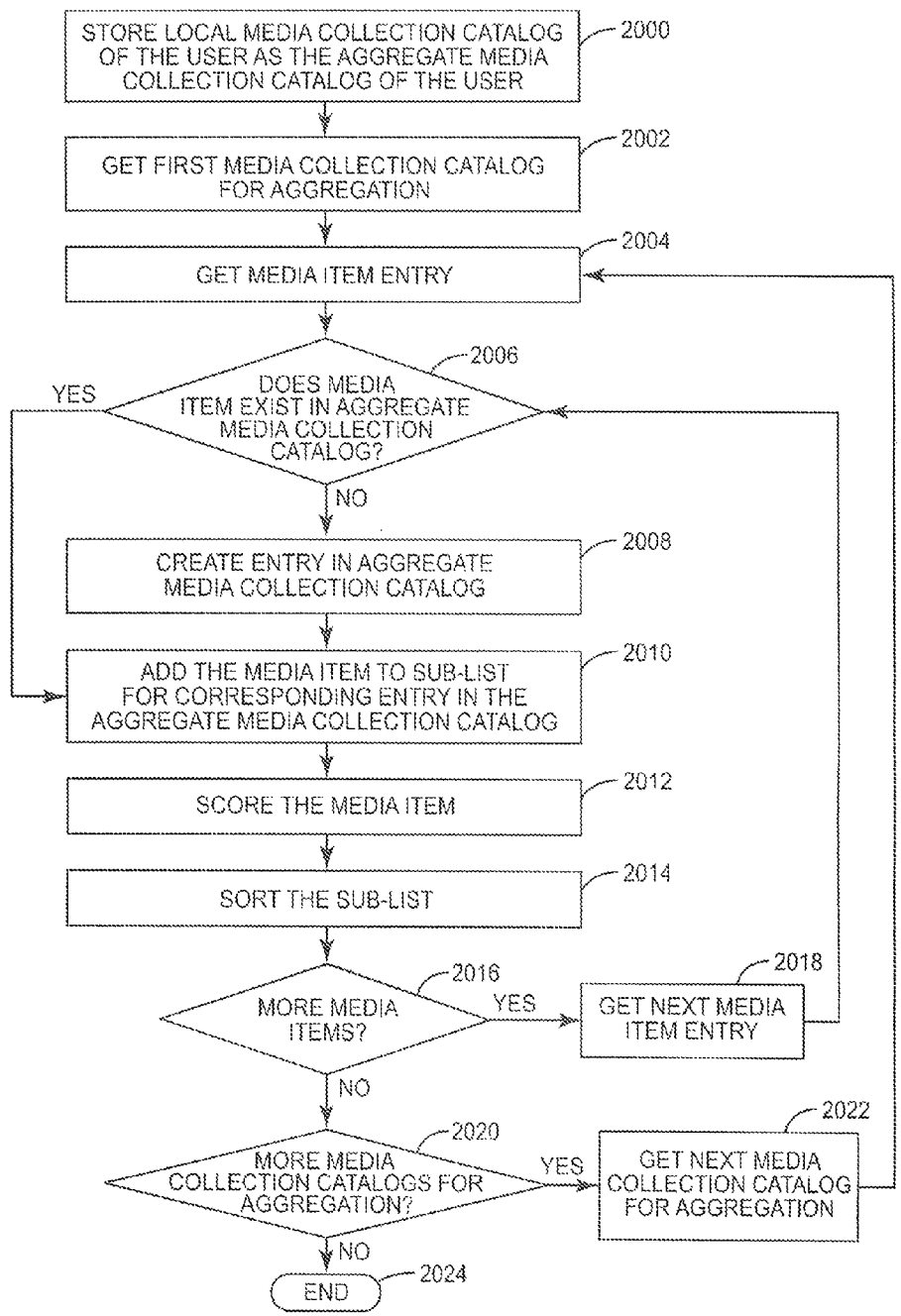
FIG. 4 illustrates a process for aggregating media collection catalogs according to one embodiment of the present disclosure.
Figure 5:
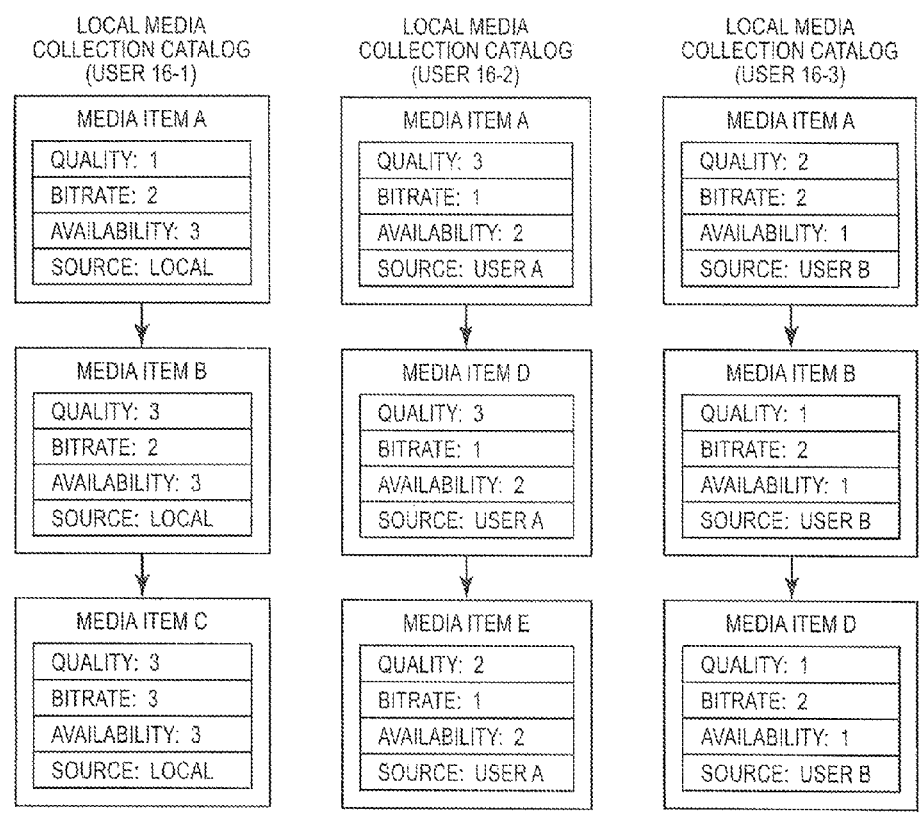
Figure 6:
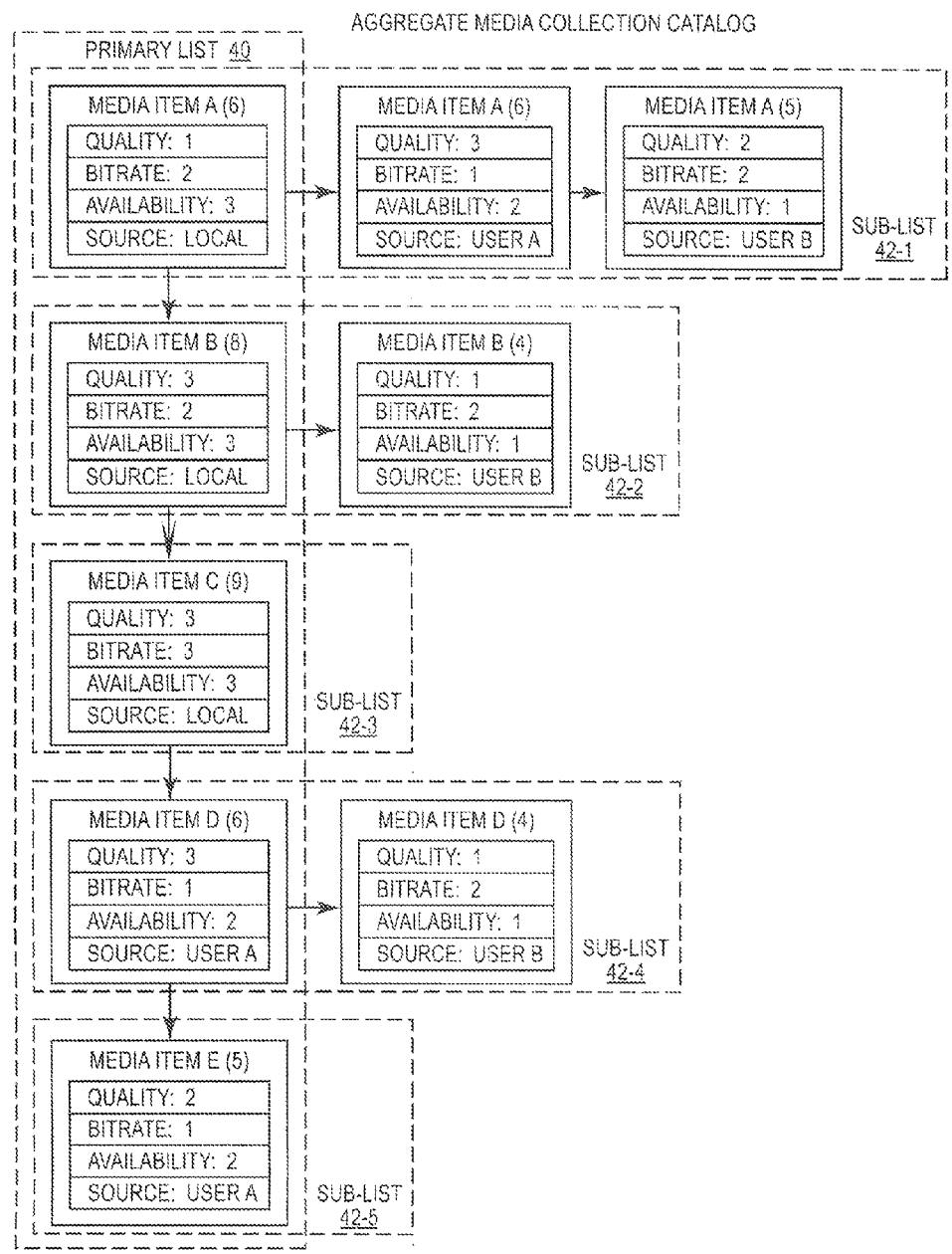
Figure 7:
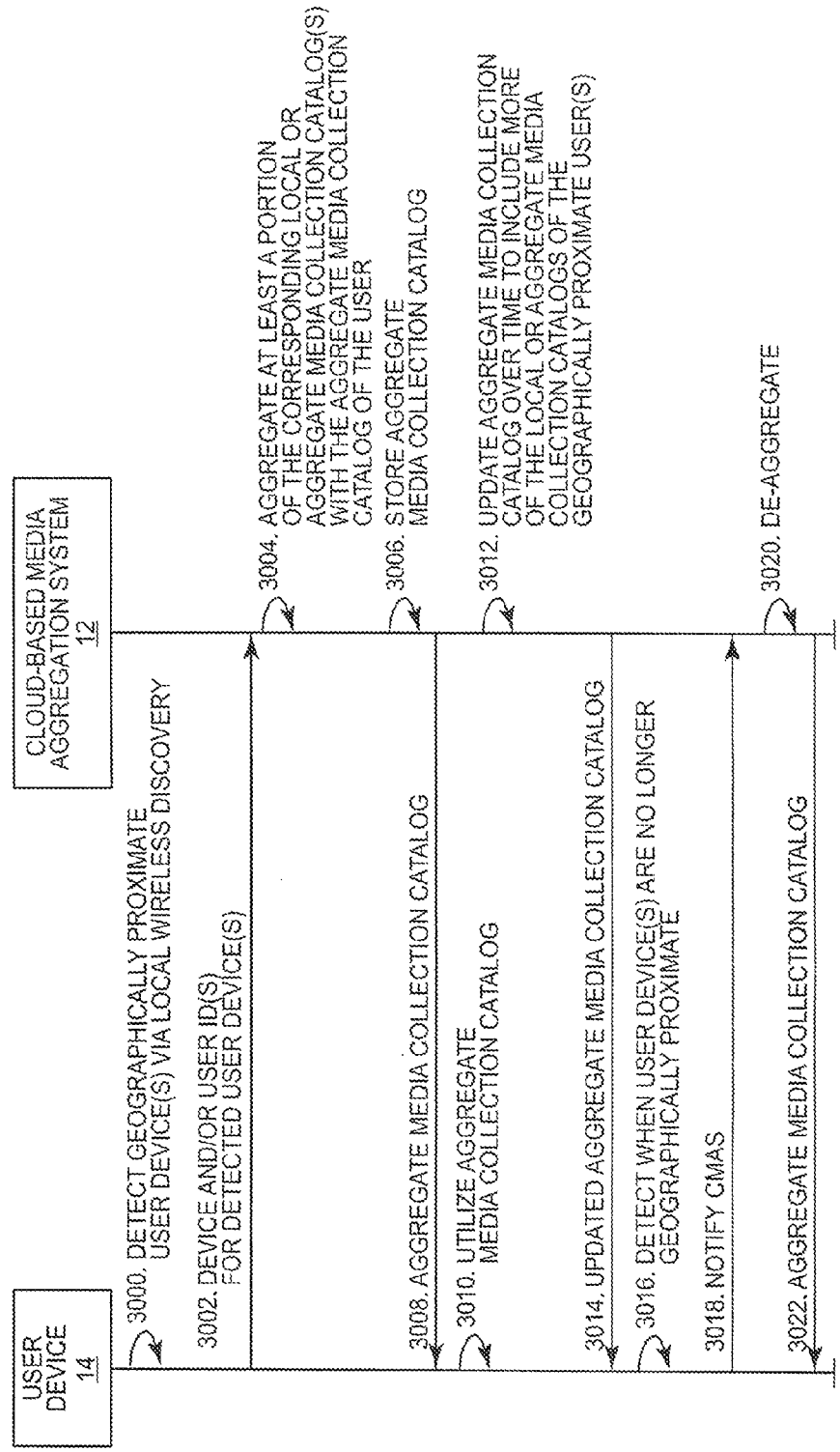
Figure 8:
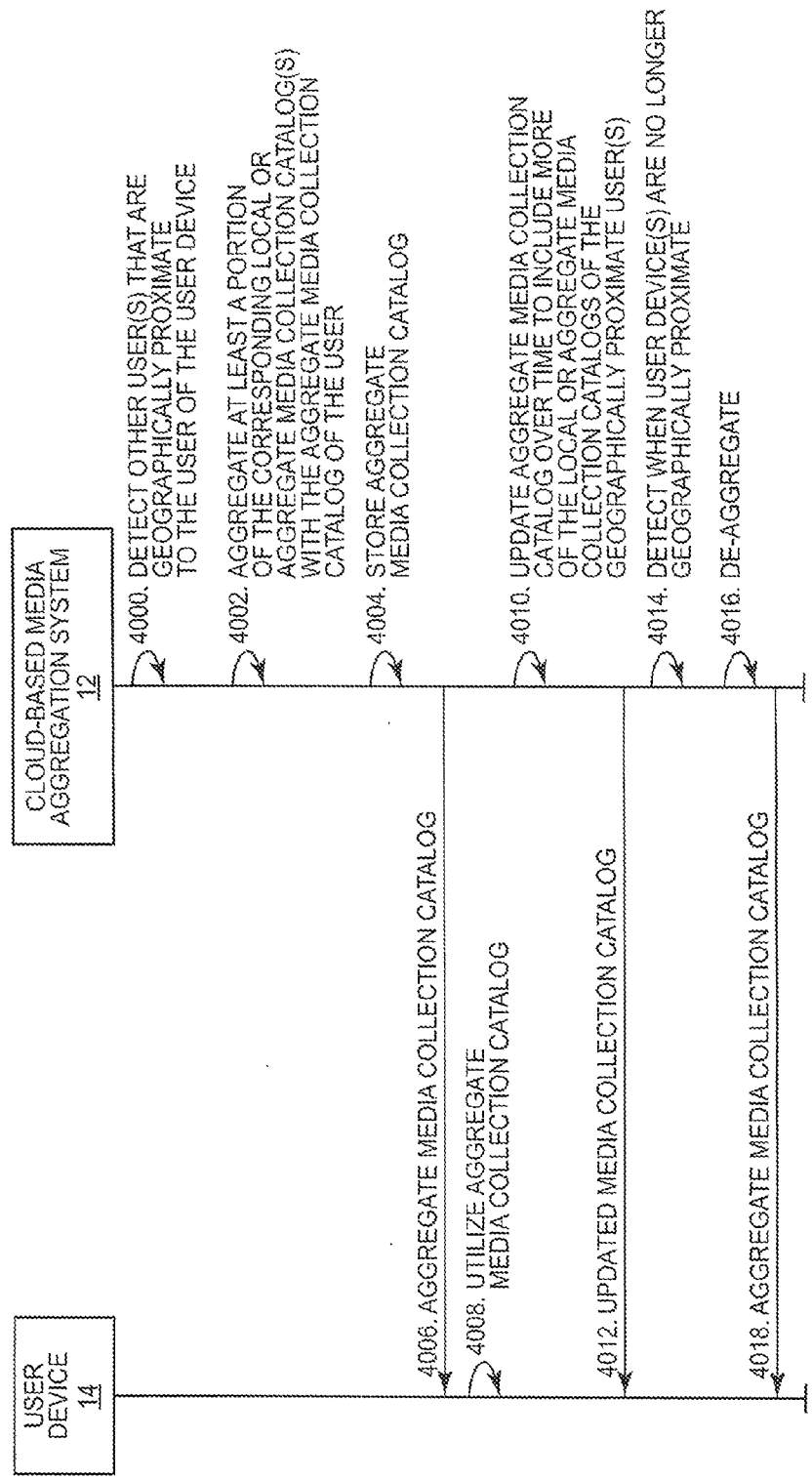
Figure 9:
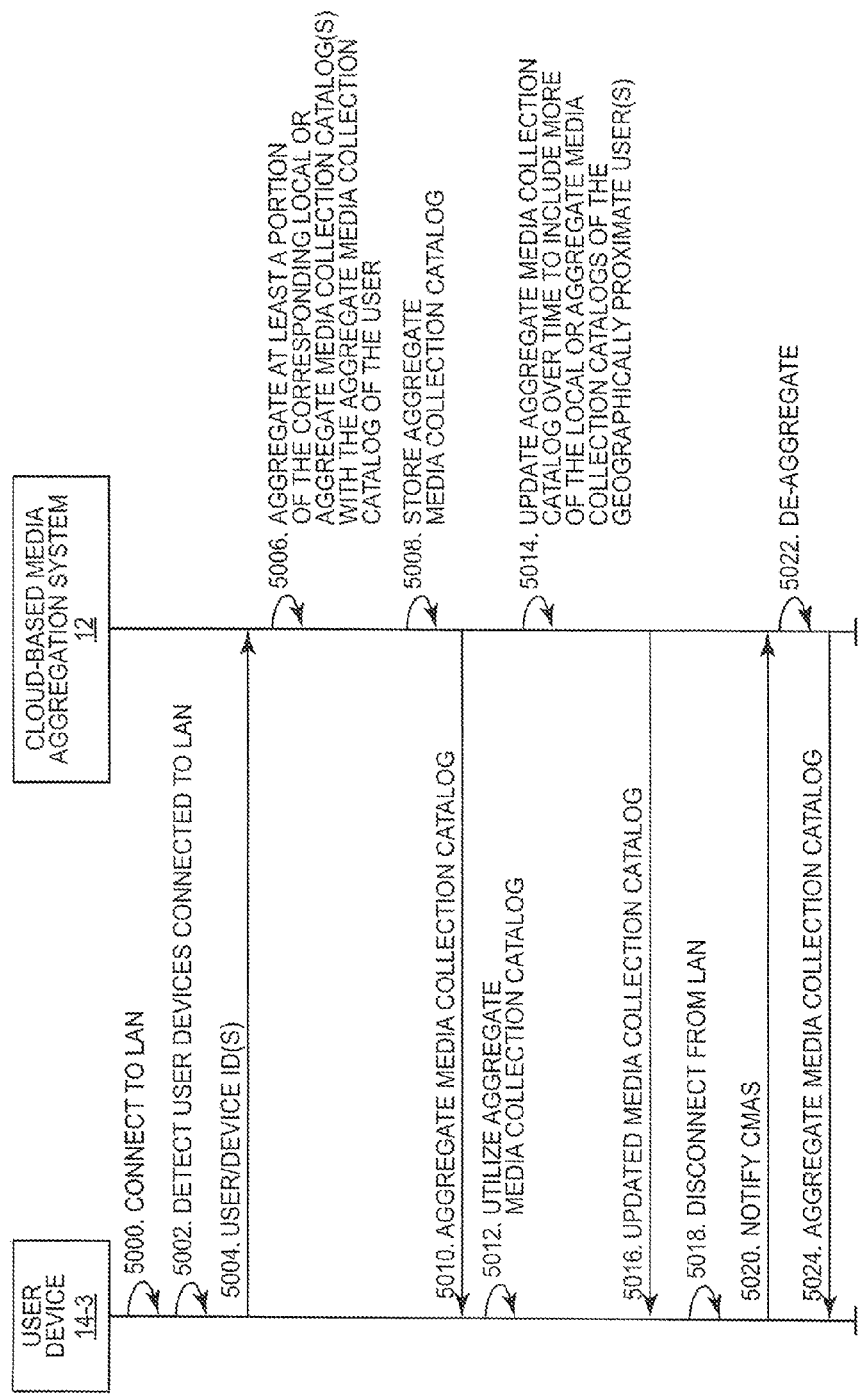
Figure 10:
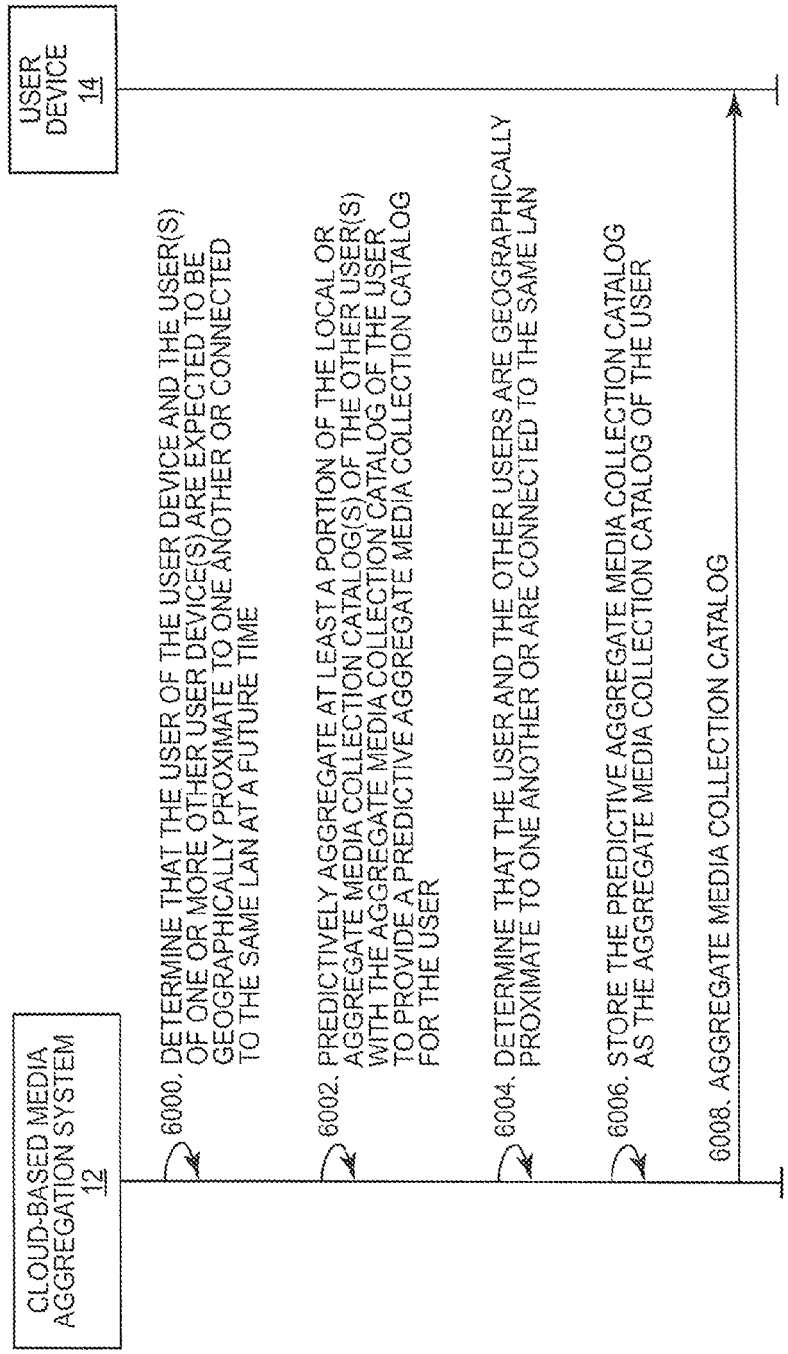
Figure 11:
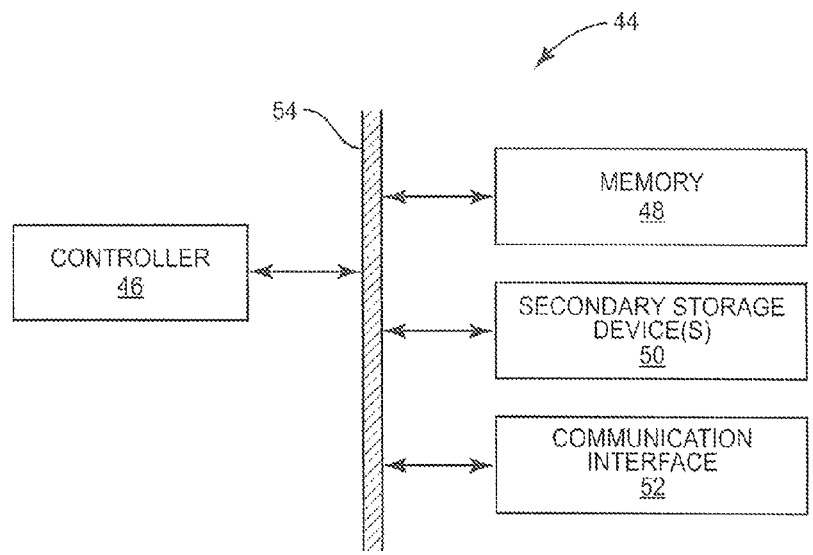
Figure 12:
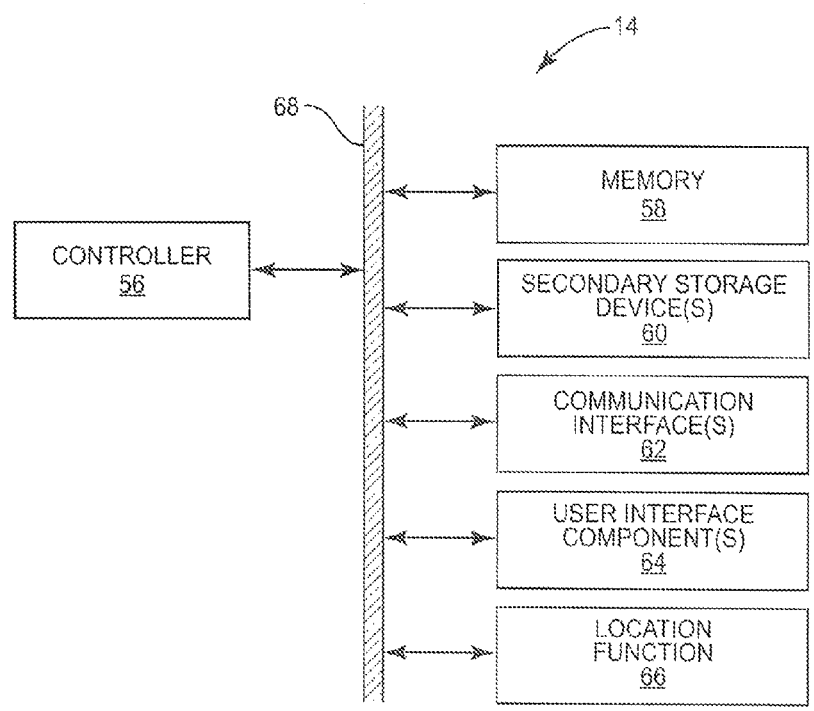

FIGS. 5 and 6 graphically illustrate the process of FIG. 4 for three exemplary media collection catalogs according to one embodiment of the present disclosure;

FIG. 7 illustrates the operation of the CMAS of FIG. 1 to dynamically aggregate a media collection catalog of a first user and media collection catalogs of one or more second users that are geographically proximate to the first user according to one embodiment of the present disclosure;

FIG. 8 illustrates the operation of the CMAS of FIG. 1 to dynamically aggregate a media collection catalog of a first user and media collection catalogs of one or more second users that are geographically proximate to the first user according to another embodiment of the present disclosure;

FIG. 9 illustrates the operation of the CMAS of FIG. 1 to dynamically aggregate a media collection catalog of a first user and media collection catalogs of one or more second users having user devices that are connected to the same Local Area Network (LAN) according to one embodiment of the present disclosure;

FIG. 10 illustrates the operation of the CMAS of FIG. 1 to proactively aggregate media collection catalogs according to one embodiment of the present disclosure;

FIG. 11 is a block diagram of a server computer hosting the CMAS of FIG. 1 according to one embodiment of the present disclosure; and FIG. 12 is a block diagram of one of the user devices of FIG. 1 according to one embodiment of the present disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The present disclosure relates to cloud-based systems and methods for aggregating media collections of users. In one embodiment, in order to generate an aggregate media collection catalog of a first user, a cloud-based media aggregation system identifies one or more second users that have an identifier that is the same as an identifier of the first user for purposes of media collection aggregation. The media aggregation system then aggregates media collection catalogs of the one or more second users with a media collection catalog of the first user to thereby provide an aggregate media collection catalog of the first user. The common identifier of the first and the one or more second users may, as discussed below, be the identifier of the same base network identified for purposes of media collection aggregation. However, the common identifier of the first and second users is not limited thereto. Other types of identifiers may be used for media collection aggregation. For example, the common identifier of the first and second users may be an identifier used by the first and the one or more second users for a service such as, for example, the Apple iTunes® Store. Other types of identifiers will be apparent to one of ordinary skill in the art upon reading this disclosure and such identifiers are considered within the scope of the present disclosure.

FIG. 1 illustrates a system 10 in which media collections can be aggregated "in the cloud" according to one embodiment of the present disclosure. In general, the system 10 includes a Cloud-based Media Aggregation System (CMAS) 12 and a number of user devices 14-1 through 14-N (generally referred to herein collectively as user devices 14 and individually as user device 14) having associated users 16-1 through 16-N (generally referred to herein collectively as users 16 and individually as user 16) where both the CMAS 12 and the user devices 14 are connected to or enabled to connect to a network 18. The network 18 is preferably a distributed, public network such as the Internet, but is not limited thereto. Further, the network 18 may include wired and/or wireless components.

The CMAS 12 is implemented as a single server computer or as a number of server computers operating in a collective fashion for purposes of load sharing and/or redundancy. The CMAS 12 includes an aggregation function 20 and a user accounts repository 22. The aggregation function 20 is preferably, but not necessarily, implemented in software and executed by a controller (e.g., a Central Processing Unit (CPU)) of the server computer(s) implementing the CMAS 12. In general, the aggregation function 20 operates to manage the user accounts repository 22 and, as discussed below, aggregate media collections of the users 16.

The user accounts repository 22 generally operates to store a user account for each of the users 16. In one embodiment, the users 16 may be required to establish user accounts at the CMAS 12 via, for example, a registration process. Each user account preferably includes a local media collection catalog that includes a listing of media items in a local media collection stored by the user device 14 of the user 16. In addition, in some embodiments, the user 16 may have more than one user device in which case the user account of the user 16 may include a local media collection catalog for each of the user devices 14 of the user 16. Further, as discussed below, the user account of the user 16 also includes an aggregate media collection catalog for the user 16.

The user devices 14 may each be any type of user device having networking and media playback capabilities. For example, each of the user devices 14 may be a personal computer, a portable media player such as an Apple® iPod® media player, a mobile telecommunications device such as an Apple® iPhone®, a tablet computer such as an Apple® iPad® device, a set-top box, or the like. As illustrated, the user devices 14-1 through 14-N include media player functions 24-1 through 24-N (generally referred to herein collectively as media player functions 24 and individually as media player function 24) and local media collections 26-1 through 26-N (generally referred to herein collectively as local media collections 26 and individually as local media collection 26), respectively. In this exemplary embodiment, CMAS clients 28-1 through 28-N (generally referred to herein collectively as CMAS clients 28 and individually as CMAS client 28) are embedded within the media player functions 24-1 through 24-N, respectively.

For each of the user devices 14, the corresponding media player function 24 may be implemented in software, hardware, or a combination thereof and generally operates to provide playback of media items from the local media collection 26 and, as discussed below, media items from an aggregate media collection catalog of the user 16 obtained from the CMAS 12. In this exemplary embodiment, the CMAS client 28 is embedded within the media player function 24. However, the present invention is not limited thereto. The CMAS client 28 may alternatively be implemented separately from the media player function 24. For example, the CMAS client 28 may be implemented as a plug-in for the media player function 24.

As discussed below, the CMAS client 28 generally operates to interact with the CMAS 12 to obtain and update an aggregate media collection catalog for the user 16. The aggregate media collection catalog generally includes an aggregate listing of media items in the local media collection 26 stored by the user device 14 of the user 16 and one of the following: (1) media items in one or more of the local media collections 26 stored by the user devices 14 of one or more other users 16 and (2) media items in aggregate media collection catalogs of one or more other users 16. In addition, if the user 16 has more than one user device 14, the aggregate listing of media items may also include media items in the local media collections 26 stored by each of the other user devices 14 of the user 16. The media player function 24 may then utilize the aggregate media collection catalog of the user 16. For example, the media player function 24 may play a media item from the aggregate media collection catalog, automatically create a playlist of media items from the aggregate media collection catalog, enable the user 16 to select a media item for playback from the aggregate media collection catalog, enable the user 16 to create a playlist of media items from the aggregate media collection catalog, enable the user 16 to purchase a media item in the aggregate media collection catalog, and/or the like.

The local media collection 26 includes a number of media items stored locally by the user device 14. These media items may include media items previously purchased by the user 16 from a remote media distribution service such as, for example, the Apple® iTunes® store. In addition or alternatively, the local media collection 26 may include media items imported from Compact Discs (CDs), Digital Video Discs (DVD), and/or the like. As used herein, a media item is an audio content item such as a song, audio book, or audio podcast; a video content item such as a movie, episode of a television program, or a video clip; or the like.

Before proceeding, it should be noted that while in the exemplary embodiment illustrated in FIG. 1 all of the user devices 14 store local media collections 26, the present disclosure is not limited thereto. One or more of the user devices 14 may not store a local media collection 28, but may still obtain aggregate media collections for the corresponding users 16 from the CMAS 12. The aggregate media collections of those users 16 may include an aggregate listing of media items from the local media collections 26 stored by the user devices 14 of two or more other users 16, media items from the aggregate media collections of two or more other users 16, and/or media items from the local media collections 26 of one or more other user devices 14 of those users 16.

Figure 2A:
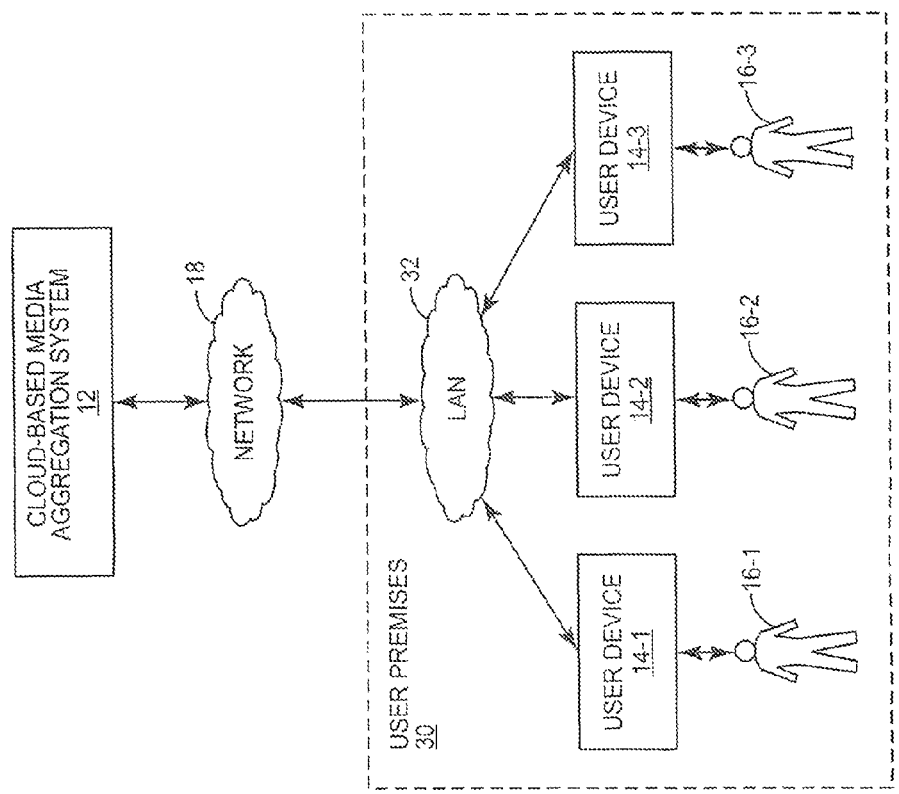
FIGS. 2A through 2D illustrate the operation of the CMAS of FIG. 1 to provide an aggregate media collection catalog of a user according to one embodiment of the present disclosure.

FIGS. 2A through 2D provide an overview of the operation of the CMAS 12 according to one embodiment of the present disclosure. As illustrated in FIG. 2A, a number of the user devices 14, namely, the user devices 14-1 through 14-3, are located at a user premises 30. The user premises 30 is generally a house, building, or other site at which users can be located. Some exemplary user premises 30 are a house, an office building, or the like. The user premises 30 includes a Local Area Network (LAN) 32 connected to the network 18. The LAN 32 may be, for example, a wireless LAN (e.g., an IEEE 802.11x wireless LAN), an Ethernet LAN, or a combination thereof. The user devices 14-1 through 14-3 are connected to the LAN 32 and are enabled to communicate with the CMAS 12 over the network 18 via the LAN 32.

As discussed below in detail, the user devices 14-1 through 14-3 are registered with the CMAS 12. The CMAS clients 28-1 through 28-3 of the user devices 14-1 through 14-3 upload the local media collection catalogs for the local media collections 26-1 through 26-3 stored by the user devices 14-1 through 14-3 of the users 16-1 through 16-3 to the CMAS 12 where the local media collection catalogs are stored in the user accounts of the users 16-1 through 16-3. In addition, the LAN 32 is identified as a base network of the users 16-1 through 16-3. For example, in one embodiment, the user premises 30 is a home of the users 16-1 through 16-3, and the users 16-1 through 16-3 identify the LAN 32 as their base network. Alternatively, the CMAS 12 may automatically identify the base network of the users 16-1 through 16-3 by, for example, detecting that the user devices 14-1 through 14-3 of the users 16-1 through 16-3 are typically connected to the LAN 32.

The CMAS 12 aggregates the local media collection catalog for the user device 14-1 of the user 16-1 with the local media collection catalogs for the user devices 14-2 and 14-3 of the other users 16-2 and 16-3 having the same base network to provide the aggregate media collection catalog of the user 16-1. Likewise, the CMAS 12 aggregates the local media collection catalog for the user device 14-2 of the user 16-2 with the local media collection catalogs for the user devices 14-1 and 14-3 of the other users 16-1 and 16-3 having the same base network to provide the aggregate media collection catalog of the user 16-2. In addition, the CMAS 12 aggregates the local media collection catalog for the user device 14-3 of the user 16-3 with the local media collection catalogs for the user devices 14-1 and 14-2 of the other users 16-1 and 16-2 having the same base network to provide the aggregate media collection catalog of the user 16-3.

Figure 2B:
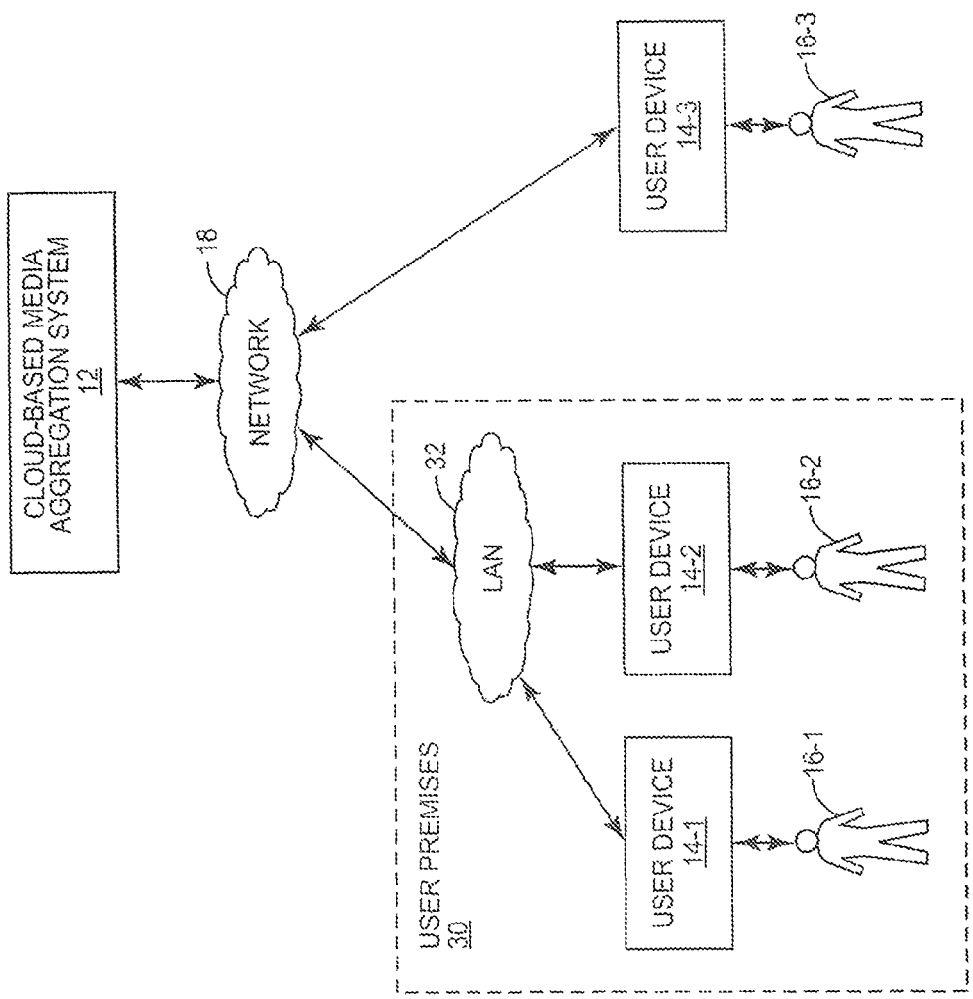

Importantly, the CMAS 12 enables the users 16-1 through 16-3 to maintain their aggregate media collection catalogs even if the users 16-1 through 16-3 leave the user premises 30 and are no longer connected to the LAN 32. For example, as illustrated in FIG. 2B, the user device 14-3, in this example, is a mobile device such as a mobile smartphone, notebook computer, or tablet computer, and the user 16-3 leaves the user premises 30 taking the user device 14-3 with him. However, even though the user device 14-3 is no longer connected to the LAN 32, the CMAS 12 enables the aggregate media collections of the users 16-1 through 16-3 to remain as if the user device 14-3 were still connected to the LAN 32. Thus, the aggregate media collection catalogs of the users 16-1 and 16-2 still include the media items from the local media collection 26-3 of the user device 14-3 of the user 16-3, and the aggregate media collection catalog of the user 16-3 still includes the media items from the local media collections 26-1 and 26-2 of the user devices 14-1 and 14-2 of the users 16-1 and 16-2. Further, the users 16-1 and 16-2 of the user devices 14-1 and 14-2 are still enabled to access media items that are in the local media collection 26-3 stored by the user device 14-3 and vice versa. As discussed below, the media items may be obtained directly from the corresponding user device 14, obtained from the corresponding user device 14 via the CMAS 12, obtained from a media item repository of the CMAS 12, or obtained from a third-party media delivery service (e.g., a subscription music or video service).

Figure 2C:
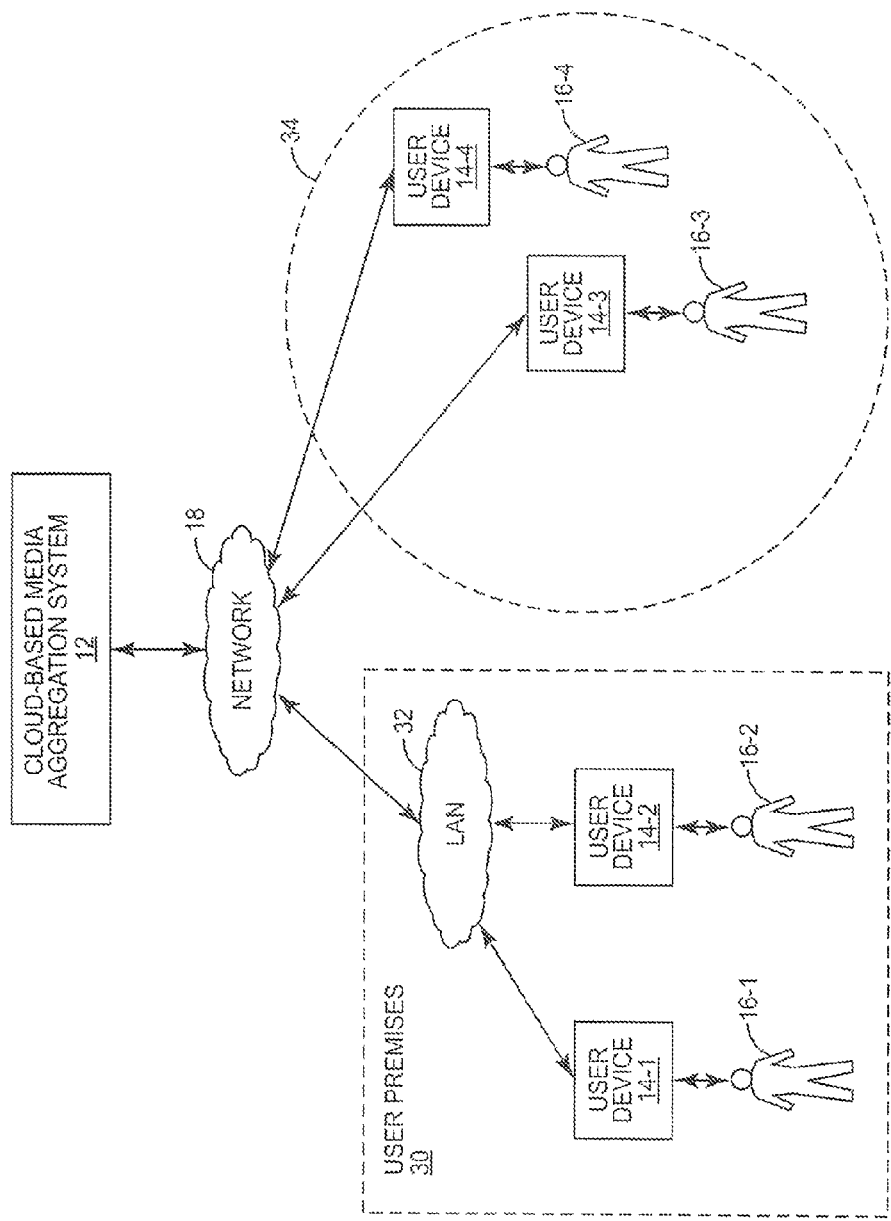

Continuing the example of FIG. 2B, assume that the user 16-3 comes within geographic proximity to user 16-4 as illustrated in FIG. 2C. In FIG. 2C, the users 16-3 and 16-4 are determined to be in geographic proximity because the user device 14-4 of the user 16-4 is within a local wireless coverage area 34 of the user device 14-3. In one specific embodiment, the local wireless coverage area 34 corresponds to a range of a Bluetooth® transceiver of the user device 14-3, which is preferably a Class 2 Bluetooth® transceiver having a range of approximately 10 meters or a Class 3 Bluetooth® transceiver having a range of approximately 1 meter. In one alternative embodiment, the CMAS 12 obtains geographic locations of the user devices 14-3 and 14-4 either from the user devices 14-3 or 14-4 or a third-party location service and determines that the users 16-3 and 16-4 are within geographic proximity of one another if the users 16-3 and 16-4 have a predefined spatial relationship. The predefined spatial relationship may be that a distance between the users 16-3 and 16-4 is less than a predefined distance such as, for example, 10 meters. However, the predefined spatial relationship is not limited thereto. As another example, the predefined spatial relationship may be that the users 16-3 and 16-4 are in a crowd of users as determined via a spatial crowd formation process such as that disclosed in commonly owned and assigned U.S. Patent Application Publication No. 2010/0198828, entitled FORMING CROWDS AND PROVIDING ACCESS TO CROWD DATA IN A MOBILE ENVIRONMENT, which published on Aug. 5, 2010; U.S. Patent Application Publication No. 2010/0197318, entitled ANONYMOUS CROWD TRACKING, which published on Aug. 5, 2010; U.S. Patent Application Publication No. 2010/0198826, entitled MAINTAINING A HISTORICAL RECORD OF ANONYMIZED USER PROFILE DATA BY LOCATION FOR USERS IN A MOBILE ENVIRONMENT, which published on Aug. 5, 2010; U.S. Patent Application Publication No. 2010/0198917, entitled CROWD FORMATION FOR MOBILE DEVICE USERS, which published on Aug. 5, 2010; U.S. Patent Application Publication No. 2010/0198870, entitled SERVING A REQUEST FOR DATA FROM A HISTORICAL RECORD OF ANONYMIZED USER PROFILE DATA IN A MOBILE ENVIRONMENT, which published on Aug. 5, 2010; U.S. Patent Application Publication No. 2010/0198862, entitled HANDLING CROWD REQUESTS FOR LARGE GEOGRAPHIC AREAS, which published on Aug. 5, 2010; and U.S. Patent Application Publication No. 2010/0197319, entitled MODIFYING A USER'S CONTRIBUTION TO AN AGGREGATE PROFILE BASED ON TIME BETWEEN LOCATION UPDATES AND EXTERNAL EVENTS, which published on Aug. 5, 2010; all of which are hereby incorporated herein by reference in their entireties.

Once the users 16-3 and 16-4 are determined to be in geographic proximity to one another, the CMAS 12 aggregates at least a portion of a media collection catalog of the user 16-4 with the aggregate media collection catalog of the user 16-3. The media collection catalog of the user 16-4 is either the local media collection catalog for the user device 14-4 of the user 16-4 or the aggregate media collection catalog of the user 16-4. In this manner, the aggregate media collection catalog of the user 16-3 is now an aggregate of the local media collection catalogs of the user devices 14-1 and 14-2 of the other users 16-1 and 16-2 having the same base network and at least a portion of the media collection catalog of the user 16-4.

An extent to which the media collection catalog of the user 16-4 is aggregated into the aggregate media collection catalog of the user 16-3 may be controlled by the CMAS 12 based on one or more predefined criteria. The one or more predefined criteria may include, for example, an amount of time that the users 16-3 and 16-4 have been or are expected to be in geographic proximity to one another, a location or type of location (e.g., a Point of Interest (POI) or a type of POI) at which the users 16-3 and 16-4 are located, a system-defined aggregation value, a user-configurable aggregation value, and/or the like. More specifically, the CMAS 12 may track the amount of time that the users 16-3 and 16-4 remain in geographic proximity to one another. Initially, only a portion of the media collection catalog of the user 16-4 may be aggregated into the aggregate media collection catalog of the user 16-3. For example, only those media item entries from the media collection catalog of the user 16-4 that most closely match predefined media preferences of the user 16-3 may be aggregated. The predefined media preferences of the user 16-3 may be stored in the user account of the user 16-3 and obtained using any suitable technology (e.g., manually by the user 16-3 and/or based on an analysis of the local media collection catalog of the user device 14-3 of the user 16-3). Then, as the amount of time that the users 16-3 and 16-4 are in geographic proximity to one another increases, more of the media collection catalog of the user 16-4 may be aggregated into the aggregate media collection catalog of the user 16-3.

In addition or alternatively, the CMAS 12 may determine an amount of time that the users 16-3 and 16-4 are expected to be in geographic proximity to one another and then select all or a portion of the media collection catalog of the user 16-4 to aggregate into the aggregate media collection catalog of the user 16-3 based on the amount of time that the users 16-3 and 16-4 are expected to be in geographic proximity to one another. For example, if the users 16-3 and 16-4 are expected to be in geographic proximity to one another for a short amount of time (e.g., less than 10 minutes), then the CMAS 12 may select a portion of the media collection catalog of the user 16-4 that most closely matches predefined media preferences of the user 16-3 to aggregate into the aggregate media collection catalog of the user 16-3. In contrast, if the users 16-3 and 16-4 are expected to be in geographic proximity to one another for a long amount of time (e.g., greater than 1 hour), then the CMAS 12 may aggregate the entire media collection catalog of the user 16-4 into the aggregate media collection catalog of the user 16-3.

The CMAS 12 may use any appropriate technique for determining the amount of time that the users 16-3 and 16-4 are expected to be in geographic proximity to one another. For example, the CMAS 12 may maintain or otherwise have access to historical information regarding previous geographic locations of the users 16-3 and 16-4 with corresponding time stamps that define times at which the users 16-3 and 16-4 were at those previous geographic locations. Using this information, the CMAS 12 may determine whether the users 16-3 and 16-4 have previously been located at their current locations and, if so, the amount of time that the users 16-3 and 16-4 have historically remained at their current location. As another example, the CMAS 12 may have access to electronic calendars of the users 16-3 and 16-4. If the users 16-3 and 16-4 are currently scheduled to participate in a meeting scheduled for one hour, then the CMAS 12 may determine that the users 16-3 and 16-4 are expected to be in geographic proximity for one hour. Again, the exemplary techniques for determining the amount of time that the users 16-3 and 16-4 are expected to be in geographic proximity discussed above are exemplary and are not intended to limit the scope of the present disclosure. Other suitable techniques may be used.

The CMAS 12 may additionally or alternatively use a POI or POI type that corresponds to the geographic locations of the users 16-3 and 16-4 to control an extent to which the media collection catalog of the user 16-4 is aggregated into the aggregate media collection catalog of the user 16-3. For instance, there may be system-defined or user-defined rules that control the extent to which the media collection catalog of the user 16-4 is aggregated into the aggregate media collection catalog of the user 16-3. For example, the user 16-3 may configure a rule that states that if the user 16-3 is located at a movie theater, then only the portion of the media collection catalog of the user 16-4 that most closely matches predefined media preferences of the user 16-3 is to be aggregated into the aggregate media collection catalog of the user 16-3. In contrast, the user 16-3 may configure another rule that states that if the user 16-3 is located at a night club, then the entire media collection catalog of the user 16-4 is to be aggregated with the aggregate media collection catalog of the user 16-3.

Lastly, the CMAS 12 may additionally or alternatively use a system-defined or user-configurable aggregation value to control the extent to which the media collection catalog of the user 16-4 is aggregated into the aggregate media collection catalog of the user 16-3. For instance, if the aggregation value is set to a maximum value, then the entire media collection catalog of the user 16-4 is aggregated into the aggregate media collection catalog of the user 16-3. In contrast, if the aggregation value is set to a minimum value, then the media collection catalog of the user 16-4 is not aggregated into the aggregate media collection catalog of the user 16-3 at all. For intermediate aggregation values, the aggregation value may control a degree to which the media item entries in the media collection catalog of the user 16-4 must match predefined media preferences of the user 16-3 before they are aggregated into the aggregate media collection catalog of the user 16-3.

At some point, the users 16-3 and 16-4 are no longer geographically proximate to one another. In the preferred embodiment, the aggregate media collection catalog of the user 16-3 temporarily retains the portion of the media collection catalog of the user 16-4 aggregated into the aggregate media collection catalog of the user 16-3 even after the users 16-3 and 16-4 are no longer geographically proximate to one another. For instance, the aggregate media collection catalog of the user 16-3 temporarily retains the portion of the media collection catalog of the user 16-4 aggregated into the aggregate media collection catalog of the user 16-3 for a predefined amount of time (e.g., 1 hour) after the users 16-3 and 16-4 are no longer geographically proximate to one another. In this manner, media collection catalogs of other users that are geographically proximate to the user 16-3, such as the user 16-4, are dynamically aggregated into the aggregate media collection catalog of the user 16-3.

Figure 2D:
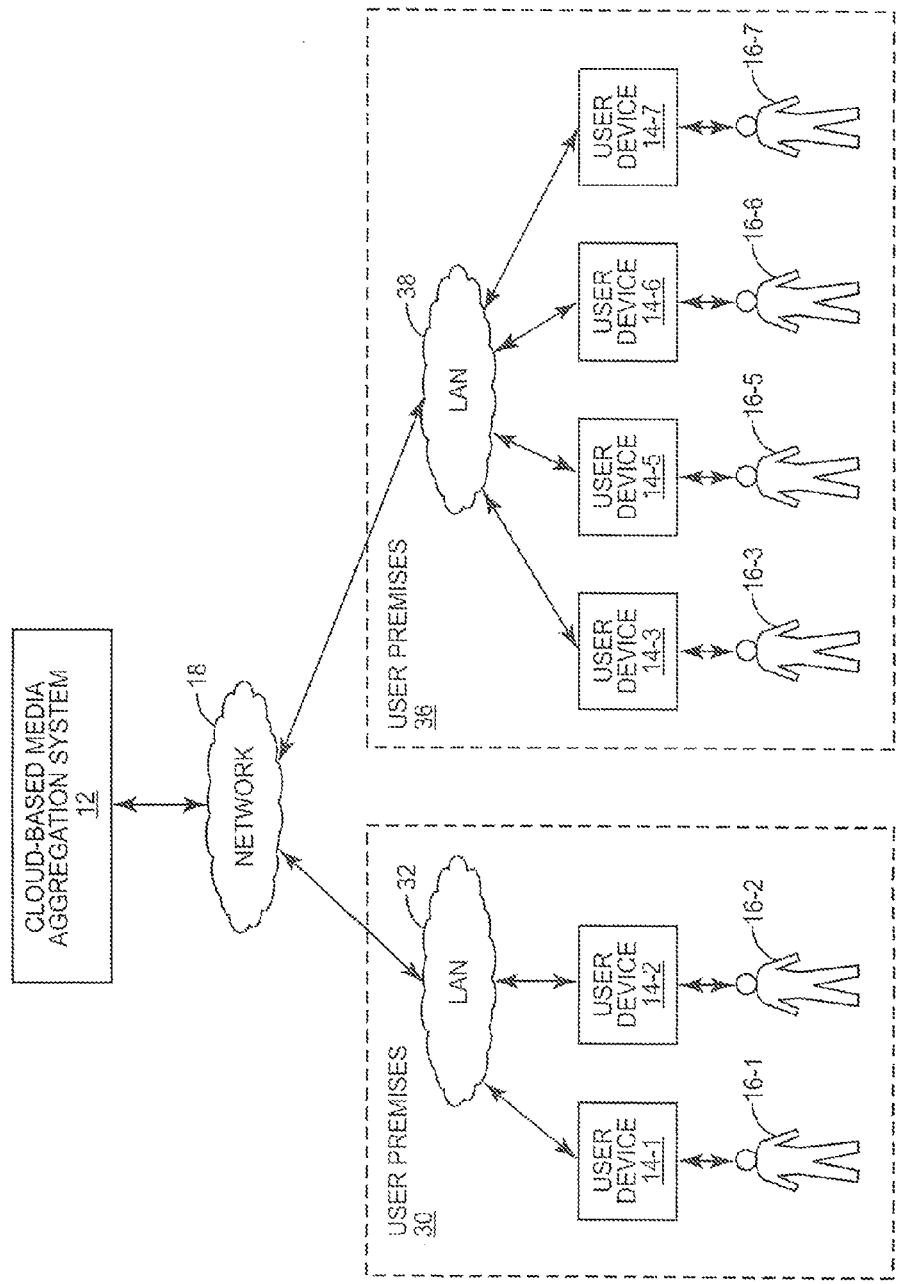

Continuing the example of FIG. 2C, the user 16-3 again moves such that the user 16-3 is no longer within geographic proximity to the user 16-4 but is now at a second user premises 36 as illustrated in FIG. 2D. The second user premises 36 includes a LAN 38, where user devices 14-5 through 14-7 are connected to the LAN 38. Once the user 16-3 is at the second user premises 36, the user device 14-3 connects to the LAN 38. The CMAS 12 determines or is notified that the user device 14-3 is connected to the LAN 38 and then operates to aggregate at least a portion of media collection catalogs of the users 16-5 through 16-7 into the aggregate media collection catalog of the user 16-3. The media collection catalogs of the users 16-5 through 16-7 are either the local media collection catalogs for the user devices 14-5 through 14-7 of the users 16-5 through 16-7 or the aggregate media collection catalogs of the users 16-5 through 16-7. In this manner, the aggregate media collection catalog of the user 16-3 is now an aggregate of the local media collection catalogs of the user devices 14-1 and 14-2 of the other users 16-1 and 16-2 having the same base network and at least a portion of the media collection catalogs of the users 16-5 through 16-7. An extent to which the media collection catalogs of the users 16-5 through 16-7 are aggregated into the aggregate media collection catalog of the user 16-3 may by controlled by the CMAS 12 based on criteria such as, for example, an amount of time that the user 16-3 has been connected to the LAN 38 or is expected to be connected to the LAN 38, the second user premises 36 or user premises type (e.g., POI type), a system-defined aggregation value, a user-configurable aggregation value, and/or the like.

At some point, the user 16-3 leaves the second user premises 36 such that the user device 14-3 is no longer connected to the LAN 38. In the preferred embodiment, the aggregate media collection catalog of the user 16-3 temporarily retains the portion of the media collection catalogs of the users 16-5 through 16-7 aggregated into the aggregate media collection catalog of the user 16-3 even after the user 16-3 is no longer at the second user premises 36. For instance, the aggregate media collection catalog of the user 16-3 temporarily retains the portion of the media collection catalogs of the users 16-5 through 16-7 aggregated into the aggregate media collection catalog of the user 16-3 for a predefined amount of time (e.g., 1 hour) after the user 16-3 has left the second user premises 36. In this manner, media collection catalogs of other users 16 at user premises other than the user premises 30 are dynamically aggregated into the aggregate media collection catalog of the user 16-3.

Figure 3:
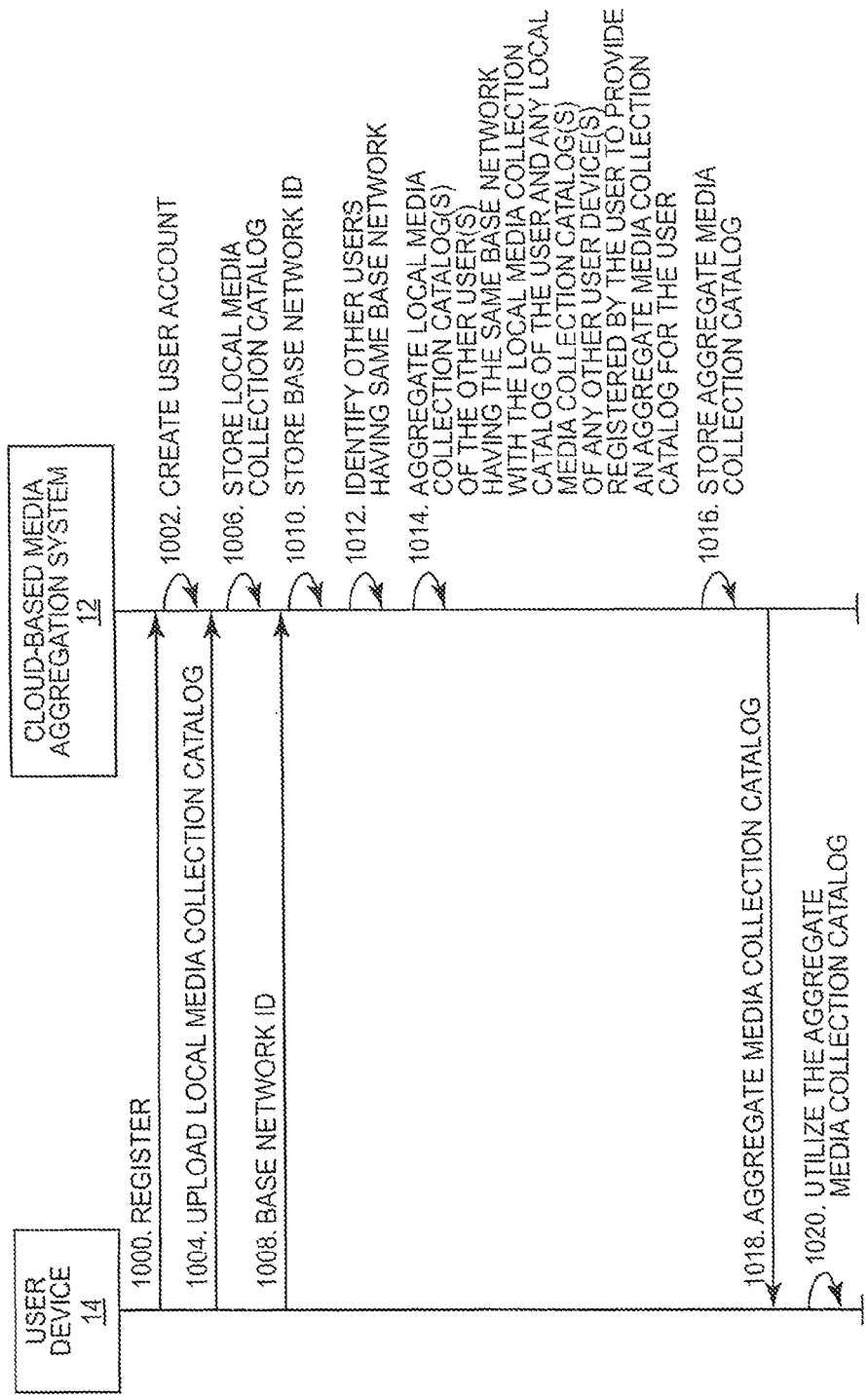
FIG. 3 illustrates the operation of the CMAS of FIG. 1 to aggregate a media collection catalog of a first user with media collection catalogs of one or more second users having the same base network as the first user to thereby provide an aggregate media collection of the first user according to one embodiment of the present disclosure.

FIG. 3 illustrates the operation of the system 10 of FIG. 1 wherein the CMAS 12 aggregates the local media collection catalogs of a group of the users 16 that have the same base network regardless of whether the user devices 14 of that group of the users 16 are currently connected to the base network according to one embodiment of the present disclosure. As illustrated, the user device 14, and more specifically the CMAS client 28 of the user device 14, registers with the CMAS 12 (step 1000). During registration, information is provided to the CMAS 12 that identifies the user device 14 and the user 16 of the user device 14. In this example, the user 16 is new to the CMAS 12. As such, the CMAS 12 creates a user account for the user 16 (step 1002). Next, the CMAS client 28 of the user device 14 generates or otherwise obtains a local media collection catalog of the user device 14 and uploads the local media collection catalog to the CMAS 12 (step 1004). The local media collection catalog includes a listing of the media items in the local media collection 26 stored at the user device 14. The CMAS client 28 may generate the local media collection catalog by examining the local media collection 26 of the user device 14 and creating corresponding media item entries in the local media collection catalog. Each media item entry in the local media collection catalog includes information that identifies a corresponding media item in the local media collection 26 of the user device 14 of the user 16 such as, for example, a name of the media item (e.g., the title of the corresponding video or song) or a Globally Unique Identifier (GUID) that identifies the media item. In addition, each media item entry may include information such as, for example, a quality of the corresponding media item, a bit rate used to encode the corresponding media item, or the like. Each media item entry may also include a Uniform Resource Indicator (URI) for accessing the corresponding media item at the user device 14 or, alternatively, the CMAS 12 or a third-party media delivery service. Upon receiving the local media collection catalog from the user device 14, the CMAS 12, and more specifically the aggregation function 20 of the CMAS 12, stores the local media collection catalog in the user account of the user 16 of the user device 14 (step 1006).

In addition to uploading the local media collection catalog, the CMAS client 28 of the user device 14 sends a base network ID for the user 16 to the CMAS 12 (step 1008). The base network ID preferably identifies a LAN that is a base network of the user 16 for purposes of media collection aggregation. The base network of the user 16 may be manually selected by the user 16 or automatically detected by the CMAS client 28. For example, the CMAS client 28 may automatically select a LAN to which the user device 14 is connected at the time of registration and/or uploading the local media collection catalog as the base network of the user 16. As another example, the CMAS client 28 may select a LAN to which the user device 14 is most often connected as the base network of the user 16. The base network ID may be any information that identifies the LAN selected as the base network. For example, the base network ID may be a network ID of the LAN. In response to receiving the base network ID, the aggregation function 20 of the CMAS 12 stores the base network ID of the user 16 in the user account of the user 16 (step 1010).

Sometime thereafter, the aggregation function 20 of the CMAS 12 identifies other users 16 that have the same base network as the user 16 (step 1012). For example, the aggregation function 20 may query or otherwise search the user accounts repository 22 using the base network ID of the base network of the user 16 to identify other users 16 that have the same base network as the user 16. Then, the aggregation function 20 aggregates the local media collection catalogs of the user devices 14 of the other users 16 having the same base network as the user 16 with the local media collection catalog of the user device 14 of the user 16 to provide an aggregate media collection catalog for the user 16 (step 1014). Also, in step 1014, if the user 16 has more than one user device 14 with associated local media collections 26, the CMAS 12 may also aggregate the local media collection catalogs of the other user devices 14 of the user 16 into the aggregate media collection catalog of the user 16. As discussed below, the aggregate media collection catalog preferably includes a primary list of unique media items among the aggregated media collection catalogs and, for each unique media item, a sub-list that contains each instance of the unique media item in the aggregated media collection catalog.

The aggregate media collection catalog of the user 16 is stored in the user account of the user 16 and sent to the user device 14 of the user 16 (steps 1016 and 1018). Notably, the aggregate media collection catalog sent to the user device 14 is preferably the same aggregate media collection catalog stored for the user 16 (e.g., includes both primary list and sub-lists). However, in an alternative embodiment, the aggregate media collection catalog sent to the user device 14 is a simplified version of the aggregate media collection catalog of the user 16 stored by the CMAS 12. For instance, the version of the aggregate media collection catalog sent to the user device 14 may include only the primary list of unique media items or a simplified version of the primary list that generally lists the unique media items and indicates whether each unique media item is stored locally or remotely.

Lastly, the CMAS client 28 of the user device 14 utilizes the aggregate media collection catalog of the user 16 (step 1020). For instance, the CMAS client 28 may present the aggregate media collection catalog to the user 16, enable the user 16 to browse the aggregate media collection catalog, enable the user 16 to create a playlist of media items from the aggregate media collection catalog, enable the user 16 to select a media item for playback from the aggregate media collection catalog, automatically select media items for playback from the aggregate media collection catalog, automatically generate playlists using the media items listed in the aggregate media collection catalog, enable the user 16 to purchase a media item listed in the aggregate media collection catalog that is not already owned by the user 16, and/or the like. Notably, the aggregate media collection catalog is preferably presented to and utilized by the user 16 as one single consolidated, or united, media collection rather than several separate media collections.

With respect to obtaining media items listed in the aggregate media collection catalog for playback, media items listed in the aggregate media collection catalog that are stored locally in the local media collection 26 of the user device 14 are obtained and played from local storage of the user device 14. In contrast, media items listed in the aggregate media collection catalog that are not stored locally in the local media collection 26 of the user device 14 are obtained from a remote source. The remote source may be another user device 14 from whose media collection catalog the media item originates, the CMAS 12, or a third-party media delivery service. Further, if the remote source is a source other than the CMAS 12, the user device 14 may obtain the media item from the remote source either directly using information (e.g., a URI) included in the aggregate media collection catalog or via the CMAS 12.

Notably, using the process of FIG. 3, the local media collection catalogs of the other users 16 having the same base network as the user 16 are aggregated with the local media collection 26 of the user 16 regardless of whether the user device 14 of the user 16 or the user devices 14 of the other users 16 are connected to the base network. As such, the user 16 has access to the media items in the local media collections 26 of the user devices 14 of the other users 16 that have the same base network even when the user device 14 of the user 16 is not connected to the base network and/or when the user devices 14 of the one or more of the other users 16 are not connected to the base network.

FIG. 4 is a more detailed illustration of step 1014 of FIG. 3 according to one embodiment of the present disclosure. First, the aggregation function 20 stores the local media collection catalog for the user device 14 of the user 16 as the aggregate media collection catalog of the user 16 (step 2000). Next, the aggregation function 20 obtains, or gets, a first media collection catalog for aggregation (step 2002). More specifically, as discussed above, the local media collection catalogs of the user devices 14 of the other users 16 having the same base network as the user 16 are identified as media collection catalogs for aggregation. In addition, any other local media collection catalogs of any other user devices 14 of the user 16 may also be identified as media collection catalogs for aggregation. Then, in step 2002, one of the identified media collection catalogs is selected as the first media collection catalog for aggregation.

Next, the aggregation function 20 obtains, or gets, a first media item entry from the media collection catalog for aggregation (step 2004). As discussed above, the media item entry includes information identifying the corresponding media item such as, for example, the GUID, title, or similar information identifying the media item. In addition, the media item entry may include information regarding a quality of the media item, a bitrate used to encode the media item, and an availability of the media item. Still further, the media item entry may include information identifying a source of the media item, such as information identifying the user device 14 on which the media item is stored or information identifying the corresponding user 16.

Next, the aggregation function 20 determines whether the media item identified by the media item entry already exists in the aggregate media collection catalog of the user 16 (step 2006). In this embodiment, the aggregate media collection catalog is formed by a primary list including a media item entry for each unique media item in the aggregate media collection catalog of the user 16. In addition, the aggregate media collection catalog may include a sub-list for each media item entry in the primary list including an entry for each occurrence of the corresponding media item in the local media collection catalog of the user 16 and the media collection catalogs identified for aggregation. For example, if a particular media item is included in the local media collections of two different users 16, the corresponding sub-list in the aggregate media collection catalog will include two entries for the media item where one entry corresponds to the media item in the local media collection 26 of one of the two users 16 and the other entry corresponds to the media item in the local media collection 26 of the other of the two users 16.

If the media item identified by the media item entry is already included in the aggregate media collection catalog of the user 16, the process proceeds to step 2010. Otherwise, the aggregation function 20 creates a media item entry in the primary list of the aggregate media collection catalog for the media item identified by the media item entry (step 2008). At this point, whether proceeding from step 2006 or 2008, a media item entry is created in the appropriate sub-list for the particular copy of the media item corresponding to the media item entry in the media collection catalog currently being processed (step 2010).

In this embodiment, the media item in the media collection catalog currently being processed is scored in order to determine which media item entry from the sub-list for the media item is to be referenced or included in the primary list for the aggregate media collection catalog (step 2012). More specifically, in one embodiment, the media item identified by the media item entry in the sub-list is scored based on quality, bitrate, availability, and/or the like. Then, based on the scores of the media item entries in the sub-list for the media item, the sub-list is sorted (step 2014). The media item entry in the sorted sub-list having the highest score is then used as the media item entry for the corresponding media item in the primary list for the aggregate media collection catalog.

The aggregation function 20 then determines whether there are more media item entries in the media collection catalog being processed for aggregation (step 2016). If so, the aggregation function 20 obtains, or gets, the next media item entry from the media collection catalog (step 2018) and returns to step 2006. The process is repeated until the last media item entry in the media collection catalog is processed. Once the last media item entry is processed, the aggregation function 20 determines whether there are more media collection catalogs to aggregate (step 2020). If so, the aggregation function 20 obtains, or gets, the next media collection catalog for aggregation (step 2022) and returns to step 2004. The process is repeated until the last media collection catalog identified for aggregation is processed to provide the aggregate media collection catalog of the user 16. Once the last media collection catalog is processed for aggregation, the process ends (step 2024).

FIGS. 5 and 6 graphically illustrate the process of FIG. 4 to aggregate the local media collection catalog of the user 16-1 and the local media collection catalogs of two other users 16-2 and 16-3 (generally referred to as user A and user B) having the same base network as the user 16-1 according to one embodiment of the present disclosure. FIG. 5 illustrates the local media collection catalog of the user device 14-1 of the user 16-1 and the local media collection catalogs of the user devices 14-2 and 14-3 of the other two users 16-2 and 16-3 having the same base network as the user 16-1. In this example, the local media collection catalog of the user device 14-1 of the user 16-1 includes media items A, B, and C, the local media collection catalog of the user device 14-2 of the user 16-2 includes media items A, D, and E, and the local media collection catalog of the user device 14-3 of the user 16-3 includes media items A, B, and D. For each media item, the corresponding media collection catalog includes a media item entry including an identifier of the media item (MEDIA ITEM X), information identifying a quality of the media item, information identifying a bitrate used when encoding the media item, information regarding the availability of the media item, and information identifying a source of the media item.

FIG. 6 illustrates the aggregate media collection catalog of the user 16-1 resulting from the aggregation of the local media collection catalogs of FIG. 5 according to one embodiment of the present disclosure. As illustrated, the aggregate media collection catalog is formed by, or represented by, a primary list 40 including a media item entry for each unique media item in the aggregate media collection catalog of the user 16-1. Sub-lists 42-1 through 42-5 include a media item entry for each occurrence of the corresponding unique media items in the aggregate media collection catalog of the user 16-1. Thus, in this example, since media item A is included in the local media collection catalog of the user device 14-1 of the user 16-1 and each of the local media collection catalogs of the user devices 14-2 and 14-3 of the users 16-2 and 16-3, the sub-list 42-1 includes three media item entries, each of which corresponds, or represents, one of the occurrences of media item A. Likewise, the sub-lists 42-2 through 42-5 are provided for the remaining media item entries in the primary list 40. The media items represented by the media item entries in the sub-lists 42-1 through 42-5 are scored based on quality, bitrate, and availability. Then, based on the scores, the sub-lists 42-1 through 42-5 are sorted such that, for each of the sub-lists 42-1 through 42-5, the media item entry representing the media item having the highest score is utilized as, or referenced by, the corresponding media item entry in the primary list 40.

FIG. 7 illustrates the operation of the system 10 of FIG. 1 to provide dynamic media collection aggregation according to one embodiment of the present disclosure. As discussed above with respect to FIG. 2C, in one embodiment, the CMAS 12 dynamically aggregates media collection catalogs of users 16 that are in geographic proximity. More specifically, in this embodiment, the CMAS client 28 of the user device 14 detects one or more other user devices 14 that are geographically proximate to the user device 14 (step 3000). The manner in which the CMAS client 28 detects the other user devices 14 that are geographically proximate to the user device 14 may vary. In one embodiment, a local wireless discovery process is utilized. For example, a Class 2 or Class 3 Bluetooth® transceiver of the user device 14 may perform a Bluetooth® discovery process to discover the other user devices 14 that are within range of the Bluetooth® transceiver of the user device 14 and therefore determined to be geographically proximate to the user device 14. Other wireless technologies may alternatively be used. The users 16 of the other user devices 14 that are geographically proximate to the user device 14 of the user 16 are identified as the other users 16 that are geographically proximate to the user 16 of the user device 14. Notably, this association between the geographically proximate user devices 14 and the users 16 of those user devices 14 may be determined by the CMAS client 28 (e.g., the CMAS client 28 may obtain the user IDs of the users 16 from the geographically proximate user devices 14) or may be determined by the CMAS 12.

Next, the CMAS client 28 of the user device 14 sends device IDs of the other user devices 14 detected in step 3000 and/or user IDs of the users 16 of the other user devices 14 detected in step 3000 to the CMAS 12 (step 3002). The aggregation function 20 of the CMAS 12 then aggregates at least a portion of the local and/or aggregate media collection catalogs of the geographically proximate users 16 (i.e., the users 16 of the geographically proximate user devices 14) with the aggregate media collection catalog of the user 16, thereby dynamically updating the aggregate media collection catalog of the user 16 (step 3004). The aggregation function 20 may control an extent to which the local and/or aggregate media collection catalogs of the geographically proximate users 16 are aggregated into the aggregate media collection catalog of the user 16 based on one or more predefined criteria. The one or more predefined criteria may include, for example, an amount of time that the geographically proximate users 16 have been or are expected to be in geographic proximity to the user 16, a location or type of location (e.g., a POI or a type of POI) at which the users 16 are located, a system-defined aggregation value, a user-configurable aggregation value, and/or the like, as discussed above. Notably, media item entries for media items aggregated into the aggregate media collection catalog of the user 16 that closely match predefined user preferences of the user 16 or are otherwise known to be of interest to the user 16 but that have seldom or never been available to the user 16 may be highlighted in the aggregate media collection catalog.

The aggregation function 20 of the CMAS 12 stores the aggregate media collection catalog of the user 16 resulting from step 3004 and sends the aggregate media collection catalog to the user device 14 (steps 3006 and 3008). The CMAS client 28 of the user device 14 then utilizes the aggregate media collection catalog of the user 16 (step 3010). For instance, the CMAS client 28 may present the aggregate media collection catalog to the user 16, enable the user 16 to browse the aggregate media collection catalog, enable the user 16 to create a playlist of media items from the aggregate media collection catalog, enable the user 16 to select a media item for playback from the aggregate media collection catalog, automatically select media items for playback from the aggregate media collection catalog, automatically generate playlists using the media items listed in the aggregate media collection catalog, enable the user 16 to purchase a media item listed in the aggregate media collection catalog that is not already owned by the user 16, and/or the like. Notably, the aggregate media collection catalog is preferably presented to and utilized by the user 16 as one single consolidated, or united, media collection rather than several separate media collections.

With respect to obtaining media items listed in the aggregate media collection catalog for playback, media items listed in the aggregate media collection catalog that are stored locally in the local media collection 26 of the user device 14 are obtained and played from local storage of the user device 14. In contrast, media items listed in the aggregate media collection catalog that are not stored locally in the local media collection 26 of the user device 14 are obtained from a remote source. The remote source may be another user device 14 from whose media collection catalog the media item originates, the CMAS 12, or a third-party media delivery service. Further, if the remote source is a source other than the CMAS 12, the user device 14 may obtain the media item from the remote source either directly using information (e.g., a URI) included in the aggregate media collection catalog or via the CMAS 12.

In this embodiment, the aggregation function 20 of the CMAS 12 updates the aggregate media collection catalog of the user 16 over time to include more of the local and/or aggregate media collection catalogs of the geographically proximate users 16 (step 3012). For example, the media items listed in the local and/or aggregate media collection catalogs of the geographically proximate users 16 may be scored based on predefined media preferences of the user 16. Initially, only the media item entries for media items scored above a threshold value may be aggregated into the aggregate media collection catalog of the user 16. Over time, the threshold value is decreased such that more and more of the media item entries from the local and/or aggregate media collection catalogs of the geographically proximate users 16 are aggregated into the aggregate media collection catalog of the user 16. As the aggregate media collection catalog of the user 16 is updated, updates to, or an updated version of, the aggregate media collection catalog of the user 16 is sent to the user device 14 for utilization by the CMAS client 28 of the user device 14 as described above (step 3014).

Sometime thereafter, the CMAS client 28 of the user device 14 detects that one or more of the other user devices 14 detected in step 3000 are no longer geographically proximate to the user device 14 (step 3016). In response, the CMAS client 28 of the user device 14 notifies the CMAS 12 that those user devices 14, or alternatively the users 16 of those user devices 14, are no longer geographically proximate to the user device 14 (step 3018). The aggregation function 20 of the CMAS 12 then de-aggregates the local and/or aggregate media collection catalog(s) of the users 16 that are no longer geographically proximate to the user 16 from the aggregate media collection catalog of the user 16 (step 3020). More specifically, the media item entries in the aggregate media collection catalog of the user 16 that are from the media collection catalogs being de-aggregated are removed from the aggregate media collection catalog of the user 16. Notably, in one embodiment, personalized metadata (e.g., ratings of the corresponding media items by the user 16, playcounts of corresponding media items by the user 16, metadata defined for the corresponding media items by the user 16, and/or the like) may be retained. With respect to personalized metadata, the interested reader is directed to commonly owned and assigned U.S. Patent Application Publication No. 2010/0070537, entitled SYSTEM AND METHOD FOR MANAGING A PERSONALIZED UNIVERSAL CATALOG OF MEDIA ITEMS, which published on Mar. 18, 2010, which is hereby incorporated herein by reference for its teachings on personalized metadata.

In one embodiment, the de-aggregation is performed immediately in response to receiving the notification in step 3018. However, in the preferred embodiment, the local and/or aggregate media collection catalogs of the one or more other users 16 are retained in the aggregate media collection catalog of the user 16 at least temporarily after the one or more other users 16 are no longer geographically proximate to the user device 14. For example, de-aggregation may be performed after a system-defined amount of time (e.g., 1 hour) has expired after receiving the notification in step 3018. In this manner, the user 16 retains access, at least temporarily, to media items listed in the media collection catalogs of the one or more other users 16 even after the one or more other users 16 are no longer geographically proximate to the user 16. After de-aggregation, an update to, or an updated version of, the aggregate media collection catalog of the user 16 is sent to the user device 14 of the user 16 for utilization by the CMAS client 28 as described above (step 3022). Using the process of FIG. 7, the aggregate media collection catalog of the user 16 is dynamically updated with media item entries from the local and/or aggregate media collection catalogs of the users 16 of other user devices 14 that are nearby (i.e., geographically proximate).

FIG. 8 illustrates the operation of the system 10 of FIG. 1 to provide dynamic media collection aggregation according to another embodiment of the present disclosure. This embodiment is substantially the same as that of FIG. 7 but where the aggregation function 20 of the CMAS 12 determines when the users 16 are geographically proximate to one another based on geographic locations of the users 16. More specifically, first, the aggregation function 20 of the CMAS 12 detects that one or more other users 16 are geographically proximate to the user 16 of the user device 14 based on geographic locations of the user 16 (step 4000). The CMAS 12 may obtain the geographic locations of the users 16 from the user devices 14, from a third-party location service (e.g., a social networking service having a location feature), or the like. The aggregation function 20 then aggregates at least a portion of the local and/or aggregate media collection catalogs of the geographically proximate users 16 into the aggregate media collection catalog of the user 16, thereby dynamically updating the aggregate media collection catalog of the user 16 (step 4002). The aggregation function 20 may control an extent to which the local and/or aggregate media collection catalogs of the geographically proximate users 16 are aggregated into the aggregate media collection catalog of the user 16 based on criteria such as, for example, an amount of time that the users 16 have been or are expected to be in geographic proximity to one another, a location or type of location (e.g., a POI or a type of POI at which the users 16 are located), a system-defined aggregation value, a user-configurable aggregation value, and/or the like, as discussed above. Notably, media item entries for media items aggregated into the aggregate media collection catalog of the user 16 that closely match predefined user preferences of the user 16 or are otherwise known to be of interest to the user 16 but that have seldom or never been available to the user 16 may be highlighted in the aggregate media collection catalog.

The aggregation function 20 of the CMAS 12 stores the aggregate media collection catalog of the user 16 resulting from step 4002 and sends the aggregate media collection catalog to the user device 14 (steps 4004 and 4006). The CMAS client 28 of the user device 14 then utilizes the aggregate media collection catalog of the user 16 (step 4008). For instance, the CMAS client 28 may present the aggregate media collection catalog to the user 16, enable the user 16 to browse the aggregate media collection catalog, enable the user 16 to create a playlist of media items from the aggregate media collection catalog, enable the user 16 to select a media item for playback from the aggregate media collection catalog, automatically select media items for playback from the aggregate media collection catalog, automatically generate playlists using the media items listed in the aggregate media collection catalog, enable the user 16 to purchase a media item listed in the aggregate media collection catalog that is not already owned by the user 16, and/or the like. Notably, the aggregate media collection catalog is preferably presented to and utilized by the user 16 as one single consolidated, or united, media collection rather than several separate media collections.

With respect to obtaining media items listed in the aggregate media collection catalog for playback, media items listed in the aggregate media collection catalog that are stored locally in the local media collection 26 of the user device 14 are obtained and played from local storage of the user device 14. In contrast, media items listed in the aggregate media collection catalog that are not stored locally in the local media collection 26 of the user device 14 are obtained from a remote source. The remote source may be another user device 14 from whose media collection catalog the media item originates, the CMAS 12, or a third-party media delivery service. Further, if the remote source is a source other than the CMAS 12, the user device 14 may obtain the media item from the remote source either directly using information (e.g., a URI) included in the aggregate media collection catalog or via the CMAS 12.

In this embodiment, the aggregation function 20 of the CMAS 12 updates the aggregate media collection catalog of the user 16 over time to include more of the local and/or aggregate media collection catalogs of the geographically proximate users 16 as discussed above (step 4010). As the aggregated media collection catalog of the user 16 is updated, updates to, or an updated version of, the aggregate media collection catalog of the user 16 is sent to the user device 14 for utilization by the CMAS client 28 of the user device 14 as described above (step 4012).

Sometime thereafter, the aggregation function 20 of the CMAS 12 detects that one or more of the other users 16 detected in step 4000 are no longer geographically proximate to the user 16 of the user device 14 (step 4014). The aggregation function 20 of the CMAS 12 then de-aggregates the local and/or aggregate media collection catalog(s) of the one or more other users 16 that are no longer geographically proximate to the user 16 from the aggregate media collection catalog of the user 16 (step 4016). Again, in one embodiment, the de-aggregation is performed immediately in response to detecting the one or more users 16 that are no longer geographically proximate to the user 16. However, in the preferred embodiment, de-aggregation is delayed such that the user 16 retains access to media items listed in the local and/or aggregate media collection catalogs of the one or more other users 16 at least temporarily after the one or more other users 16 are no longer geographically proximate to the user 16. After de-aggregation, an update to, or an updated version of, the aggregate media collection catalog of the user 16 is sent to the user device 14 of the user 16 for utilization by the CMAS client 28 as described above (step 4018). Using the process of FIG. 8, the aggregate media collection catalog of the user 16 is dynamically updated with media item entries from the local and/or aggregate media collection catalogs of the users 16 of other user devices 14 that are nearby (i.e., geographically proximate).

FIG. 9 illustrates the operation of the system 10 of FIG. 1 to provide dynamic media collection aggregation according to yet another embodiment of the present disclosure. As discussed above with respect to FIG. 2D, in one embodiment, the CMAS 12 dynamically aggregates media collection catalogs of users 16 that are connected to the same LAN even when the users 16 have different base networks. Using the scenario illustrated in FIG. 2D as an example for this discussion, the user device 14-3 connects to the LAN 38 and detects the other user devices 14-5 through 14-7 that are also connected to the LAN 38 (steps 5000 and 5002). The CMAS client 28-3 of the user device 14-3 then sends user IDs of the users 16-5 through 16-7 of the other user devices 14-5 through 14-7 that are connected to the LAN 38 or the device IDs of the other user devices 14-5 through 14-7 connected to the LAN 38 to the CMAS 12 (step 5004).

The aggregation function 20 of the CMAS 12 then aggregates at least a portion of the local media collection catalogs of the user devices 14-5 through 14-7 and/or the aggregate media collection catalogs of the users 16-5 through 16-7 into the aggregate media collection catalog of the user 16-3, thereby dynamically updating the aggregate media collection catalog of the user 16-3 (step 5006). The aggregation function 20 may control an extent to which the local and/or aggregate media collection catalogs are aggregated into the aggregate media collection catalog of the user 16-3 based on criteria such as, for example, an amount of time that the user device 14-3 of the user 16-3 (and optionally the user devices 14-5 through 14-7 of the users 16-5 through 16-7) have been or are expected to be connected to the LAN 38, a location or type of location (e.g., a POI or a type of POI) of the second user premises 36 at which the LAN 38 is located, a system-defined aggregation value, a user-configurable aggregation value, and/or the like, as discussed above. Notably, media item entries for media items aggregated into the aggregate media collection catalog of the user 16-3 that closely match predefined user preferences of the user 16-3 or are otherwise known to be of interest to the user 16-3 but that have seldom or never been available to the user 16-3 may be highlighted in the aggregate media collection catalog.

The aggregation function 20 of the CMAS 12 stores the aggregate media collection catalog of the user 16-3 resulting from step 5006 and sends the aggregate media collection catalog to the user device 14-3 (steps 5008 and 5010). The CMAS client 28-3 of the user device 14-3 then utilizes the aggregate media collection catalog of the user 16-3 (step 5012). For instance, the CMAS client 28-3 may present the aggregate media collection catalog to the user 16-3, enable the user 16-3 to browse the aggregate media collection catalog, enable the user 16-3 to create a playlist of media items from the aggregate media collection catalog, enable the user 16-3 to select a media item for playback from the aggregate media collection catalog, automatically select media items for playback from the aggregate media collection catalog, automatically generate playlists using the media items listed in the aggregate media collection catalog, enable the user 16-3 to purchase a media item listed in the aggregate media collection catalog that is not already owned by the user 16-3, and/or the like. Notably, the aggregate media collection catalog is preferably presented to and utilized by the user 16-3 as one single consolidated, or united, media collection rather than several separate media collections.

With respect to obtaining media items listed in the aggregate media collection catalog for playback, media items listed in the aggregate media collection catalog that are stored locally in the local media collection 26-3 of the user device 14-3 are obtained and played from local storage of the user device 14-3. In contrast, media items listed in the aggregate media collection catalog that are not stored locally in the local media collection 26-3 of the user device 14-3 are obtained from a remote source. The remote source may be another user device 14 from whose media collection catalog the media item originates, the CMAS 12, or a third-party media delivery service. Further, if the remote source is a source other than the CMAS 12, the user device 14-3 may obtain the media item from the remote source either directly using information (e.g., a URI) included in the aggregate media collection catalog or via the CMAS 12.

In this embodiment, the aggregation function 20 of the CMAS 12 updates the aggregate media collection catalog of the user 16-3 over time to include more of the local media collection catalogs of the user devices 14-5 through 14-7 and/or the aggregate media collection catalogs of the users 16-5 through 16-7 of the user devices 14-5 through 14-7 (step 5014). For example, the media items listed in the local and/or aggregate media collection catalogs of the users 16-5 through 16-7 may be scored based on predefined media preferences of the user 16-3. Initially, only the media item entries for media items scored above a threshold value may be aggregated into the aggregate media collection catalog of the user 16-3. Over time, the threshold value is decreased such that more and more of the media item entries from the local and/or aggregate media collection catalogs of the users 16-5 through 16-7 are aggregated into the aggregate media collection catalog of the user 16-3. As the aggregate media collection catalog of the user 16-3 is updated, updates to, or an updated version of, the aggregate media collection catalog of the user 16-3 is sent to the user device 14-3 for utilization by the CMAS client 28-3 of the user device 14-3 as described above (step 5016).

Sometime thereafter, the user device 14-3 disconnects from the LAN 38 (step 5018), and the CMAS client 28-3 of the user device 14-3 notifies the CMAS 12 (5020). The aggregation function 20 of the CMAS 12 then de-aggregates the local and/or aggregate media collection catalog(s) of the users 16-5 through 16-7 from the aggregate media collection catalog of the user 16-3 (step 5022). More specifically, the media item entries in the aggregate media collection catalog of the user 16-3 that are from the media collection catalogs being de-aggregated are removed from the aggregate media collection catalog of the user 16-3. Notably, in one embodiment, personalized metadata (e.g., ratings of the corresponding media items by the user 16-3, playcounts of corresponding media items by the user 16-3, metadata defined for the corresponding media items by the user 16-3, and/or the like) may be retained, as discussed above.

In one embodiment, the de-aggregation is performed immediately in response to receiving the notification in step 5020. However, in the preferred embodiment, de-aggregation is delayed such that the user 16-3 retains access to the local and/or aggregate media collection catalogs of the users 16-5 through 16-7 at least temporarily after the user device 14-3 has disconnected from the LAN 38. Notably, when disconnected from the LAN 38, the user device 14-3 may be enabled to connect to the network 18 via, for example, a wireless cellular communications interface (e.g., a 3G or 4G wireless cellular communications interface). For example, de-aggregation may be performed after a system-defined amount of time (e.g., 1 hour) has expired after receiving the notification in step 5020. After de-aggregation, an update to, or an updated version of, the aggregate media collection catalog of the user 16-3 is sent to the user device 14-3 of the user 16-3 for utilization by the CMAS client 28-3 as described above (step 5024). Using the process of FIG. 9, the aggregate media collection catalog of the user 16-3 is dynamically updated with media item entries from the local and/or aggregate media collection catalogs of the users 16 of other user devices 14 that are connected to the same LAN as the user device 14 of the user 16 even if the users 16 have different base networks.

FIG. 10 illustrates the operation of the CMAS 12 to optimize media collection catalog aggregation by predicting when users are expected to be geographically proximate to one another and/or when the user devices of the users are expected to be connected to the same LAN according to one embodiment of the present disclosure. First, the aggregation function 20 of the CMAS 12 determines that the user 16 of the user device 14 and one or more other users 16 of one or more other user devices 14 are expected to be either geographically proximate to one another or connected to the same LAN at a future time (step 6000). This determination may be based on any type of suitable information such as, for example:

a historical record of previous geographic locations of the users 16,
    a historical record of previous LAN connections of the user devices 14 of the users 16,
    route information defining routes being traveled by or to be traveled by the users 16, and/or
    calendar information from electronic calendars of the users 16 that define events (e.g., meetings) scheduled for the users 16, dates and times for which the events are scheduled, and, in some embodiments, other users 16 to participate in the events and/or geographic locations at which the events are scheduled to occur.

More specifically, a historical record of previous geographic locations of the users 16 may be maintained by the CMAS 12 or may otherwise be accessible to the CMAS 12. The historical record may define the previous geographic locations of the users 16 as well as dates and/or times at which the users 16 were at those previous geographic locations. Based on the historical record, the aggregation function 20 is enabled to predict future geographic locations of the users 16 and then determine when two or more of the users 16 are expected to be in geographic proximity to one another in the future. Similarly, a historical record of previous LAN connections of the user devices 14 of the users 16 may be maintained by the CMAS 12 or may otherwise be accessible to the CMAS 12. This historical record may define LANs to which the user devices 14 of the users 16 have previously been connected as well as dates and/or times at which the user devices 14 were connected to those LANs. Using this information, the aggregation function 20 is enabled to predict future LAN connections of the user devices 14 of the users 16 and then determine when the user devices 14 of two or more of the users 16 are expected to be connected to the same LAN in the future.

In addition or alternatively, the aggregation function 20 may have access to route information for traveling routes currently being traveled by or planned to be traveled by the users 16. The route information may be obtained from, for example, separate navigation systems of the users 16 (e.g., personal navigation devices or in-vehicle navigation devices) or navigation components or features of the user devices 14. Using the route information, the aggregation function 20 is enabled to determine when two or more of the users 16 are expected to be in geographic proximity to one another.

In addition or alternatively, the aggregation function 20 may have access to calendar information from electronic calendars of the users 16 that defines events (e.g., meetings) scheduled for the users 16, dates and times for which the events are scheduled, and, in some embodiments, other users 16 to participate in the events and/or geographic locations at which the events are scheduled to occur. Using this calendar information, the aggregation function 20 can determine when two or more of the users 16 are scheduled to be in geographic proximity to one another in the future.

Next, the aggregation function 20 of the CMAS 12 predictively aggregates at least a portion of the local media collection catalogs of the user devices 14 of the one or more other users 16 or the aggregate media collection catalogs of the one or more other users 16 with the aggregate media collection catalog of the user 16 to provide a predictive aggregate media collection catalog for the user 16 (step 6002). Thereafter, the aggregation function 20 determines that the user 16 and the one or more other users 16 are geographically proximate to one another or that the user devices 14 of the user 16 and the one or more other users 16 are connected to the same LAN (step 6004). In response, the aggregation function 20 stores the predictive aggregate media collection catalog as the aggregate media collection catalog of the user 16 (step 6006) and sends the aggregate media collection catalog of the user 16 to the user device 14 of the user 16 (step 6008).

FIG. 11 is a block diagram of a server computer 44 implementing the CMAS 12 according to one embodiment of the present disclosure. As illustrated, the server computer 44 includes a controller 46 connected to memory 48, one or more secondary storage devices 50, and a communication interface 52 by a bus 54 or similar mechanism. The controller 46 is a microprocessor, digital Application Specific Integrated Circuit (ASIC), Field Programmable Gate Array (FPGA), or similar hardware component. In this embodiment, the controller 46 is a microprocessor, and the aggregation function 20 (FIG. 1) is implemented in software and stored in the memory 48 for execution by the controller 46. Further, the user accounts repository 22 (FIG. 1) may be stored in the one or more secondary storage devices 50. The secondary storage devices 50 are digital data storage devices such as, for example, one or more hard disk drives. The communication interface 52 is a wired or wireless communication interface that communicatively couples the server computer 44 to the network 18 (FIG. 1). For example, the communication interface 52 may be an Ethernet interface, local wireless interface such as a wireless interface operating according to one of the suite of IEEE 802.11 standards, or the like.

FIG. 12 is a block diagram of one of the user devices 14 according to one embodiment of the present disclosure. As illustrated, the user device 14 includes a controller 56 connected to memory 58, one or more secondary storage devices 60, one or more communication interfaces 62, one or more user interface components 64, and a location function 66 by a bus 68 or similar mechanism. The controller 56 is a microprocessor, digital ASIC, FPGA, or similar hardware component. In this embodiment, the controller 56 is a microprocessor, and the media player function 24 including the CMAS client 28 is implemented in software and stored in the memory 58 for execution by the controller 56. The local media collection 26 (FIG. 1) may be stored in the one or more secondary storage devices 60, which may be, for example, FLASH memory, one or more hard disk drives, or the like. The one or more communication interfaces 62 include a wired or wireless communication interface that communicatively couples the user device 14 to the network 18 (FIG. 1). For example, the one or more communication interfaces 62 may include a local wireless interface such as a wireless interface operating according to one of the suite of IEEE 802.11 standards, a mobile communications interface such as a cellular telecommunications interface, or the like. The one or more communication interfaces 62 may also include a Bluetooth® interface or other local wireless interface to, for example, detect other user devices 14 that are geographically proximate to the user device 14. Note that the same local wireless interface may be utilized to both connect the user device 14 to the network 18 and detect nearby devices. The one or more user interface components 64 include, for example, a touchscreen, a display, one or more user input components (e.g., a keypad), a speaker, or the like, or any combination thereof. Lastly, the user device 14 may include, in some embodiments, a location function 66 for determining a geographical location of the user device 14. For example, the location function 64 may be a hardware component such as, for example, a Global Positioning System (GPS) receiver.

It should be noted that the systems and methods described herein have substantial opportunity for variation without departing from the spirit or scope of the present disclosure. For example, while the discussion above primarily focuses on the aggregation of local media collection catalogs of the users 16, the present disclosure is not limited thereto. In one alternative embodiment, some or all of the users 16 may have user media collections stored by a cloud-based media collection storage and possibly playback service. One such service is Amazon's Cloud Music player, which enables users to store their music collections in the cloud and then play their music from any user device having web access. If the media collections owned by the users 16 are stored by such a cloud-based service, the CMAS 12 may additionally or alternatively operate to aggregate corresponding media collection catalogs of the users 16 for the user media collections stored by the cloud-based service using the processes described herein. Further, the CMAS 12 may be integrated with a cloud-based media storage and playback service or may be separate from the cloud-based media storage and playback service. The media items listed in the aggregate media collection catalogs of the users 16 may then be accessible from the cloud-based service.

As another example, while dynamic media aggregation has been described herein with respect to FIGS. 7 through 10 as aggregating media collection catalogs of other users 16 into the aggregate media collection catalog of the user 16, the present disclosure is not limited thereto. Dynamic media aggregation may alternatively be performed without the media aggregation process of FIG. 3. In other words, the dynamic media aggregation processes described herein may aggregate media collection catalogs of other users 16 into the media collection catalog of the user 16, where the media collection catalog of the user 16 may be an aggregate media collection catalog of the user 16, a local media collection catalog of the user device 14 of the user 16, or, as discussed above, a user media collection catalog of the user 16 stored by a cloud-based service.

Those skilled in the art will recognize improvements and modifications to the preferred embodiments of the present disclosure. All such improvements and modifications are considered within the scope of the concepts disclosed herein and the claims that follow.

What is claimed is:

1. A method of operation in a server computer to generate an aggregate media collection catalog for a first user, the server computer comprising a communication interface to communicate with users, at least one processor in communication with the communication interface, and memory containing software executable by the at least one processor, the method, when executed by the at least one processor, comprising:

identifying, by the server computer, one or more second users having a base network identifier for purposes of media collection aggregation that is the same as the base network identifier of the first user for purposes of media collection aggregation, the base network identifier of the first user for purposes of media collection aggregation identifying a network that is a base network of the first user used for purposes of media collection aggregation;

aggregating, by the server computer media collection catalogs of the one or more second users with a media collection catalog of the first user to thereby provide the aggregate media collection catalog of the first user, the aggregate media collection catalog of the first user comprising a list of all unique media items in the aggregate media collection catalog;

determining that the first user and one or more third users are expected to be in geographic proximity at a future time;

in response to determining that the first user and the one or more third users are expected to be in geographic proximity to one another, dynamically aggregating at least a portion of media collection catalogs of the one or more third users into the aggregate media collection catalog of the first user to provide a predictive aggregate media collection catalog for the first user;

at some time after dynamically aggregating at least a portion of the media collection catalogs of the one or more third users into the aggregate media collection catalog of the first user to provide the predictive aggregate media collection catalog for the first user, determining that the first user and the one or more third users are in geographic proximity to one another; and in response to determining that the first user and the one or more third users are in geographic proximity to one another, utilizing the predictive aggregate media collection catalog as the aggregate media collection catalog of the first user.

2. The method of claim 1 further comprising obtaining media collection catalogs for a plurality of users including the first user and the one or more second users, each media collection catalog being a media collection catalog for a corresponding one of the plurality of users.

3. The method of claim 1 wherein:

aggregating the media collection catalogs comprises aggregating the media collection catalogs of the one or more second users with the media collection catalog of the first user regardless of whether user devices of the first user and the one or more second users are connected to a base network identified by the base network identifier to thereby provide the aggregate media collection catalog of the first user.

4. The method of claim 3 wherein the user device of the first user is connected to the base network and a user device of at least one of the one or more second users is not connected to the base network.

5. The method of claim 3 wherein the user device of the first user is not connected to the base network.

6. The method of claim 3 wherein the user devices of the first user and the one or more second users are not connected to the base network.

7. The method of claim 3 wherein the base network is a Local Area Network (LAN).

8. The method of claim 3 wherein the base network is a Local Area Network (LAN) selected by the first user as the base network of the first user and selected by the one or more second users as the base network of the one or more second users.

9. The method of claim 3 wherein, the base network is a Local Area Network (LAN) automatically selected as the base network of the first user and the one or more second users.

10. The method of claim 9 further comprising automatically selecting the LAN as the base network of the first user and the one or more second users based on a historical record of LAN connections of the user devices of the first user and the one or more second users.

11. The method of claim 3 further comprising:

communicating with the user device of the first user to perform a registration for the first user; and automatically selecting a Local Area Network (LAN) to which the user device of the first user is connected at the time of registration of the first user as the base network of the first user.

12. The method of claim 3 wherein the media collection catalog of the first user is a local media collection catalog that lists media items in a local media collection stored by the user device of the first user, and the method further comprises:

receiving the local media collection catalog from the user device of the first user; and automatically selecting a Local Area Network (LAN) to which the user device of the first user is connected at the time of receiving the local media collection catalog from the user device of the first user as the base network of the first user.

13. The method of claim 3 further comprising:
  determining that the user device of the first user and user devices of one or more third users are connected to the same Local Area Network (LAN) that is not the base network of the first user; and
  in response to determining that the user device of the first user and the user devices of the one or more third users are connected to the same LAN, dynamically aggregating at least a portion of media collection catalogs of the one or more third users into the aggregate media collection catalog of the first user.

14. The method of claim 13 further comprising:
  determining that the user device of the first user has disconnected from the LAN;
  temporarily retaining the media collection catalogs of the one or more third users in the aggregate media collection catalog of the first user for a defined amount of time; and
  de-aggregating the media collection catalogs of the one or more third users from the aggregate media collection catalog of the first user after the defined amount of time has expired.

15. The method of claim 13 wherein dynamically aggregating at least a portion of the media collection catalogs of the one or more third users into the aggregate media collection catalog of the first user comprises controlling an extent to which the media collection catalogs of the one or more third users are aggregated into the aggregate media collection catalog of the first user based on one or more predefined criteria.

16. The method of claim 15 wherein the one or more predefined criteria comprise one or more of a group consisting of: amount of time that the user device of the first user is connected to the same LAN as the user devices of the one or more third users, amount of time that the user device of the first user and the user devices of the one or more third users are expected to be connected to the same LAN, a geographic location at which the first user and the one or more third users are located, a location type of a geographic location at which the first user and the one or more third users are located, a system-defined aggregation value, and a user-defined aggregation value.

17. The method of claim 1 wherein the media collection catalogs of the first user and the one or more second users comprise listings of media items in corresponding media collections of the first user and the one or more second users but do not include the media items in the corresponding media collections of the first user and the one or more second users.

18. The method of claim 1 wherein the media collection catalogs of the first user and the one or more second users are local media collection catalogs that list media items in corresponding local media collections stored by corresponding user devices of the first user and the one or more second users.

19. The method of claim 1 wherein the media collection catalogs of the first user and the one or more second users are media collection catalogs that list media items in corresponding media collections of the first user and the one or more second users.

20. The method of claim 1 wherein the aggregate media collection catalog further comprises, for each unique media item in the listing of all unique media items, a sub-list of all instances of the unique media item in the media collection catalogs of the first user and the one or more second users.

21. The method of claim 1 further comprising sending the aggregate media collection catalog of the first user to the user device of the first user.

22. The method of claim 21 wherein the aggregate media collection catalog enables the first user to access media items listed in the aggregate media collection catalog.

23. The method of claim 1 further comprising storing the aggregate media collection catalog of the first user.

24. The method of claim 1 further comprising:
  determining that the one or more third users are geographically proximate to the first user; and
  in response to determining that the one or more third users are geographically proximate to the first user, dynamically aggregating at least a portion of media collection catalogs of the one or more third users into the aggregate media collection catalog of the first user.

25. The method of claim 24 further comprising:
  determining that at least one of the one or more third users is no longer geographically proximate to the first user;
  temporarily retaining the media collection catalog of the at least one of the one or more third users in the aggregate media collection catalog of the first user for a defined amount of time; and
  de-aggregating the media collection catalog of the at least one of the one or more third users from the aggregate media collection catalog of the first user after the defined amount of time has expired.

26. The method of claim 24 wherein dynamically aggregating at least a portion of the media collection catalogs of the one or more third users into the aggregate media collection catalog of the first user comprises controlling an extent to which the media collection catalogs of the one or more third users are aggregated into the aggregate media collection catalog of the first user based on one or more predefined criteria.

27. The method of claim 26 wherein the one or more predefined criteria comprise one or more of a group consisting of: amount of time that the first user and the one or more third users are in geographic proximity to one another, amount of time that the first user and the one or more third users are expected to be in geographic proximity to one another, a geographic location at which the first user and the one or more third users are located, a location type of a geographic location at which the first user and the one or more third users are located, a system-defined aggregation value, and a user-defined aggregation value.

28. A method of operation in a server computer to generate an aggregate media collection catalog for a first user, the server computer comprising a communication interface to communicate with users, at least one processor in communication with the communication interface, and memory containing software executable by the at least one processor, the method, when executed by the processor, comprising:
  identifying, by the server computer, one or more second users having a base network identifier for purposes of media collection aggregation that is the same as the base network identifier of the first user for purposes of media collection aggregation, the base network identifier of the first user for purposes of media collection aggregation identifying a network that is a base network of the first user used for purposes of media collection aggregation;
  aggregating, by the server computer media collection catalogs of the one or more second users with a media collection catalog of the first user to thereby provide the aggregate media collection catalog of the first user, the aggregate media collection catalog of the first user comprising a list of all unique media items in the aggregate media collection catalog;
  determining that the user device of the first user and user devices of one or more third users are expected to be connected to the same Local Area Network (LAN) at a future time;
  in response to determining that the user device of the first user and the user devices of the one or more third users are expected to be connected to the same LAN, dynamically aggregating at least a portion of media collection catalogs of the one or more third users into the aggregate media collection catalog of the first user to provide a predictive aggregate media collection catalog for the first user;

at some time after dynamically aggregating at least a portion of the media collection catalogs of the one or more third users into the aggregate media collection catalog of the first user to provide the predictive aggregate media collection catalog for the first user, determining that the user device of the first user and the user devices of the one or more third users are connected to the same LAN; and in response to determining that the user device of the first user and the user devices of the one or more third users are connected to the same LAN, utilizing the predictive aggregate media collection catalog as the aggregate media collection catalog of the first user.

29. A server computer comprising a communication interface communicatively coupling the server computer to a network and memory containing software executable by a hardware controller associated with the communication interface, the hardware controller adapted to, in order to generate an aggregate media collection catalog of a first user, execute a method comprising:

identifying one or more second users having a base network identifier for purposes of media collection aggregation that is the same as the base network identifier of the first user for purposes of media collection aggregation, the base network identifier of the first user for purposes of media collection aggregation identifying a network that is a base network of the first user used for purposes of media collection aggregation;

aggregating media collection catalogs of the one or more second users with a media collection catalog of the first user to thereby provide the aggregate media collection catalog of the first user, the aggregate media collection catalog of the first user comprising a list of all unique media items in the aggregate media collection catalog determine that the first user and one or more third users are expected to be in geographic proximity at a future time;

in response to determining that the first user and the one or more third users are expected to be in geographic proximity to one another, dynamically aggregate at least a portion of media collection catalogs of the one or more third users into the aggregate media collection catalog of the first user to provide a predictive aggregate media collection catalog for the first user;

at some time after dynamically aggregating at least a portion of the media collection catalogs of the one or more third users into the aggregate media collection catalog of the first user to provide the predictive aggregate media collection catalog for the first user, determine that the first user and the one or more third users are in geographic proximity to one another; and in response to determining that the first user and the one or more third users are in geographic proximity to one another, utilize the predictive aggregate media collection catalog as the aggregate media collection catalog of the first user.

30. A non-transitory computer-readable medium storing software for instructing a controller of a server computer to, in order to generate an aggregate media collection catalog of a first user:

identify one or more second users having a base network identifier for purposes of media collection aggregation that is the same as the base network identifier of the first user for purposes of media collection aggregation, the base network identifier of the first user for purposes of media collection aggregation identifying a network that is a base network of the first user used for purposes of media collection aggregation; and aggregate media collection catalogs of the one or more second users with a media collection catalog of the first user to thereby provide the aggregate media collection catalog of the first user, the aggregate media collection catalog of the first user comprising a list of all unique media items in the aggregate media collection catalog determine that the first user and one or more third users are expected to be in geographic proximity at a future time;

in response to determining that the first user and the one or more third users are expected to be in geographic proximity to one another, dynamically aggregate at least a portion of media collection catalogs of the one or more third users into the aggregate media collection catalog of the first user to provide a predictive aggregate media collection catalog for the first user;

at some time after dynamically aggregating at least a portion of the media collection catalogs of the one or more third users into the aggregate media collection catalog of the first user to provide the predictive aggregate media collection catalog for the first user, determine that the first user and the one or more third users are in geographic proximity to one another; and in response to determining that the first user and the one or more third users are in geographic proximity to one another, utilize the predictive aggregate media collection catalog as the aggregate media collection catalog of the first user.

* * * * *